(12) United States Patent
Takahashi

(10) Patent No.: US 11,582,363 B2
(45) Date of Patent: *Feb. 14, 2023

(54) INFORMATION PROCESSING APPARATUS, STORAGE MEDIUM, AND INFORMATION PROCESSING SYSTEM

(71) Applicant: Ricoh Company, Ltd., Tokyo (JP)

(72) Inventor: Teruaki Takahashi, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/323,642

(22) Filed: May 18, 2021

(65) Prior Publication Data

US 2021/0274062 A1  Sep. 2, 2021

Related U.S. Application Data

(63) Continuation of application No. 16/593,387, filed on Oct. 4, 2019, now Pat. No. 11,044,381, which is a
(Continued)

(30) Foreign Application Priority Data

Feb. 26, 2015  (JP) ................................. 2015-036830
Jan. 28, 2016  (JP) ................................. 2016-014423

(51) Int. Cl.
*H04N 1/327*    (2006.01)
*H04N 1/00*     (2006.01)
(Continued)

(52) U.S. Cl.
CPC ....... *H04N 1/32767* (2013.01); *G06F 3/1204* (2013.01); *G06F 3/1236* (2013.01);
(Continued)

(58) Field of Classification Search
None
See application file for complete search history.

(56) References Cited

U.S. PATENT DOCUMENTS 7,965,401 B2   6/2011  Ishimaru
8,310,704 B2   11/2012 Imai
(Continued)

FOREIGN PATENT DOCUMENTS

JP    2005-252564   9/2005
JP    2006128957    5/2006
(Continued)

OTHER PUBLICATIONS

Office Action dated Jul. 2, 2019 in Japanese Patent Application No. 2016-014423.
(Continued)

*Primary Examiner* — Frantz Bataille
(74) *Attorney, Agent, or Firm* — Xsensus LLP

(57) ABSTRACT

An information processing apparatus connectable to one or more devices via a network. The apparatus includes a measuring unit measuring an inclination of the apparatus; a determining unit determining whether the inclination of the apparatus relative to a given surface of one of the one or more devices is within a predetermined inclination range; a receiving unit that receives radio waves; an obtaining unit obtaining identification information from the radio waves; a radio wave strength measuring unit measuring strength of the radio waves; a selection unit determining whether to select a given one of the one or more devices based on the strength of the radio waves; and a connection unit connecting the information processing apparatus to one of the one or more devices selected by the selection unit and for which the inclination of the apparatus is within the predetermined inclination range.

29 Claims, 19 Drawing Sheets

Related U.S. Application Data continuation of application No. 15/629,188, filed on Jun. 21, 2017, now Pat. No. 10,484,570, which is a continuation of application No. 15/052,072, filed on Feb. 24, 2016, now Pat. No. 9,729,736.

(51) Int. Cl.
<table>
<tr><td>G06F 3/12</td><td>(2006.01)</td></tr>
<tr><td>H04W 4/80</td><td>(2018.01)</td></tr>
<tr><td>H04W 4/02</td><td>(2018.01)</td></tr>
<tr><td>H04W 76/10</td><td>(2018.01)</td></tr>
<tr><td>H04W 24/08</td><td>(2009.01)</td></tr>
<tr><td>H04W 84/12</td><td>(2009.01)</td></tr>
</table>

(52) U.S. Cl.
CPC ....... *G06F 3/1292* (2013.01); *H04N 1/00307* (2013.01); *H04N 1/00315* (2013.01); *H04N 1/00323* (2013.01); *H04W 4/026* (2013.01); *H04W 4/80* (2018.02); *H04W 24/08* (2013.01); *H04W 76/10* (2018.02); *H04N 2201/006* (2013.01); *H04N 2201/0039* (2013.01); *H04N 2201/0055* (2013.01); *H04N 2201/0094* (2013.01); *H04W 84/12* (2013.01)

(56) References Cited

U.S. PATENT DOCUMENTS

| | | | |
|---|---|---|---|
| 8,836,981 | B2 | 9/2014 | Takahashi |
| 9,007,640 | B2 | 4/2015 | Kishimoto |
| 9,013,743 | B2 | 4/2015 | Takahashi |
| 9,069,503 | B2 | 6/2015 | Takahashi |
| 2003/0177207 | A1 | 9/2003 | Nagasaka |
| 2008/0194205 | A1 | 8/2008 | Kusakari |
| 2011/0051185 | A1 | 3/2011 | Takahashi |
| 2011/0058208 | A1 | 3/2011 | Takahashi |
| 2014/0106777 | A1* | 4/2014 | Fukuda ............... G01S 5/0027 455/456.1 |
| 2014/0240782 | A1 | 8/2014 | Terashita |
| 2015/0029540 | A1 | 1/2015 | Jo |
| 2015/0103376 | A1 | 4/2015 | Saeda |
| 2015/0223145 | A1* | 8/2015 | Yoon ................... H04W 48/04 370/328 |
| 2016/0006902 | A1* | 1/2016 | Okamoto .......... H04N 1/00342 358/1.13 |
| 2016/0360477 | A1 | 12/2016 | Saeki |

FOREIGN PATENT DOCUMENTS

| | | |
|---|---|---|
| JP | 2008-017381 | 1/2008 |
| JP | 2008-228271 A | 9/2008 |
| JP | 2010-047004 | 3/2010 |
| JP | 2010-199870 | 9/2010 |
| JP | 2013-095136 | 5/2013 |
| JP | 2014-056409 | 3/2014 |
| JP | 2014-068305 | 4/2014 |
| JP | 2014-096781 | 5/2014 |
| JP | 2014-167747 A | 9/2014 |
| JP | 2015-031961 A | 2/2015 |

OTHER PUBLICATIONS

Office Action dated Aug. 23, 2022 in Japanese Patent Application No. 2021-079428, 3 pages.

\* cited by examiner

INFORMATION PROCESSING APPARATUS, STORAGE MEDIUM, AND INFORMATION PROCESSING SYSTEM

CROSS REFERENCE TO RELATED APPLICATIONS

This application is a continuation of U.S. patent application Ser. No. 16/593,387, filed Oct. 4, 2019, which is a continuation of U.S. patent application Ser. No. 15/629,188, filed Jun. 21, 2017, now U.S. Pat. No. 10,484,570 issued Nov. 19, 2019, which is a continuation of U.S. patent application Ser. No. 15/052,072, filed Feb. 24, 2016, now U.S. Pat. No. 9,729,736 issued Aug. 8, 2017, which claims the benefit of Japanese Priority Patent Application No. 2015-036830 filed Feb. 26, 2015, and Japanese Priority Patent Application No. 2016-014423, filed Jan. 28, 2016, the entire contents of which are incorporated herein by reference.

BACKGROUND OF THE INVENTION

1. Field of the Invention

The present invention relates to an information processing apparatus, a storage medium, and an information processing system.

2. Description of the Related Art

When connecting to an image forming device, an information processing apparatus such as a radio communication terminal obtains connection information via a first radio communication method and is connected via a second radio communication method, using the connection information.

There is a technique of standing by without initiating image formation based on print data until detecting that a mobile terminal that will transmit the print data enters a predetermined area and, upon detecting the entering of the predetermined area, releasing the stand-by state (see Patent Document 1, for example).

An information processing apparatus such as a radio communication terminal receives signals transmitted from an image processing device via radio communication and, if received signal strength of the signals becomes a predetermined threshold or more, the information processing apparatus is connected to the image processing device based on the received signals.

However, if a plurality of image processing devices are disposed, the information processing apparatus may accidentally measure received signal strength of signals transmitted via radio communication by one of the image processing devices which is adjacent to another image processing device in front of the information processing apparatus. If the received signal strength is higher than a predetermined threshold, the information processing apparatus may be connected to the image processing device which is different and adjacent to the image processing device to which a job is to be sent.

Further, an information processing apparatus such as a radio communication terminal may be left in proximity to an image processing device and accidentally measure signals transmitted via radio communication from the image processing device. If received signal strength of the signals is higher than a predetermined threshold, the information processing apparatus may communicate with the image processing device and send a job against the will of a user.

[Patent Document 1] Japanese Laid-Open Patent Application No. 2008-17381

SUMMARY OF THE INVENTION

It is an object of at least one embodiment of the present invention to provide an information processing system in which when connecting to an image processing device, an information processing apparatus obtains connection information via radio communication and is connected, using the connection information. Even if a plurality of image processing devices are disposed, connection information is obtained via radio communication from a desired one of the image processing devices.

In an embodiment, an information processing apparatus connectable to one or more devices via a network is provided. The information processing apparatus includes a measuring unit that measures an inclination of the information processing apparatus; a determining unit that determines whether the inclination of the information processing apparatus relative to a given surface of one of the one or more devices is within a predetermined inclination range; a receiving unit that receives a plurality of radio waves output by each of the one or more devices; an obtaining unit that obtains identification information from each of the radio waves received by the receiving unit, the identification information being unique to a respective one of the one or more devices; a radio wave strength measuring unit that measures strength of the radio waves received by the receiving unit; a selection unit that determines whether to select a given one of the one or more devices based on the strength of the radio waves having the identification information of the given one of the one or more devices; and a connection unit that connects the information processing apparatus to one of the one or more devices that is selected by the selection unit and for which the inclination of the information processing apparatus is within the predetermined inclination range.

BRIEF DESCRIPTION OF THE DRAWINGS

Other objects and further features of embodiments will become apparent from the following detailed description when read in conjunction with the accompanying drawings, in which.

DESCRIPTION OF THE PREFERRED EMBODIMENTS

Figure 1:
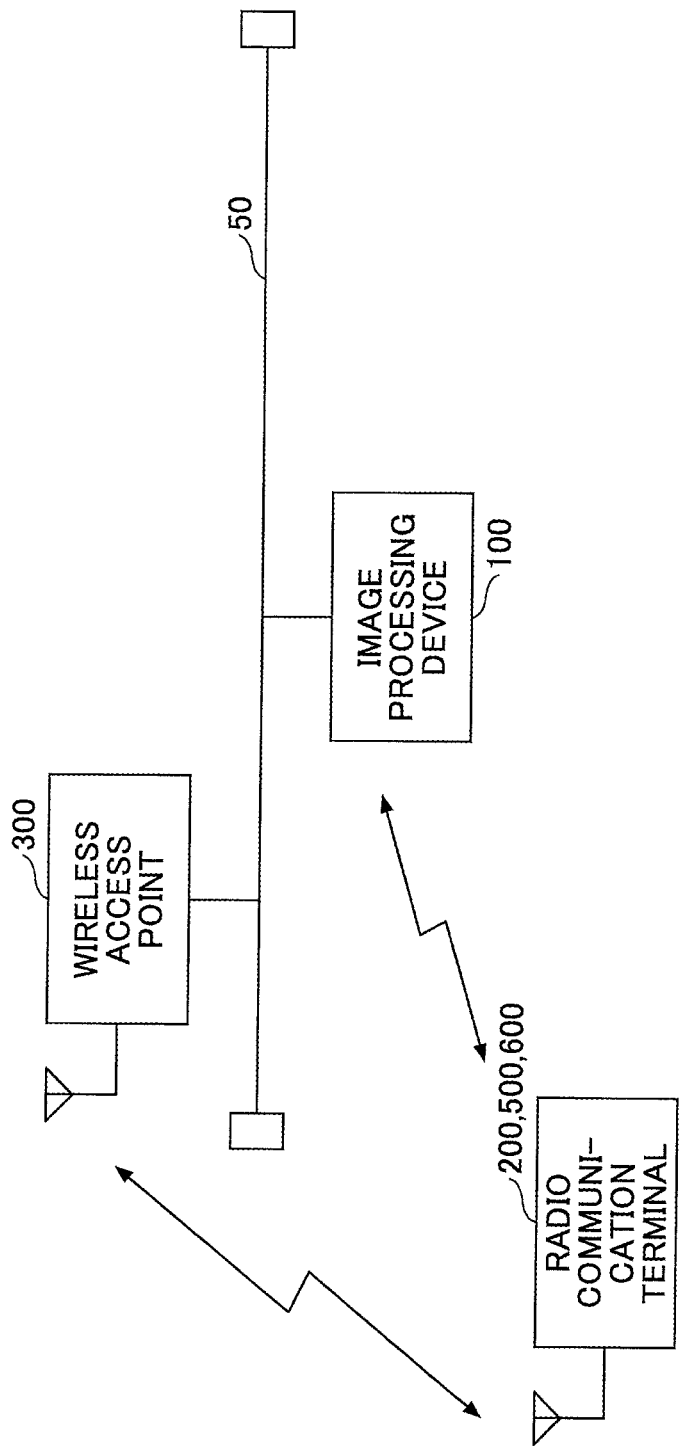
FIG. 1 is a diagram showing a configuration of an image processing system according to embodiments.

In the following, an embodiment to implement the present invention is described based on examples below while referring to the drawings. The examples described below are used only for exemplification, and the embodiment to which the present invention is applied is not limited to the examples below. In all the drawings describing the examples, the same reference numerals are used for elements having the same function and a repetition of description will be avoided.

<Outline>
<Image Processing System>

FIG. 1 is a diagram showing a configuration of an image processing system according to the embodiments. The image processing system includes an image processing device 100 and a radio communication terminal 200.

An image forming device such as a multifunction peripheral or a printer may be applied to the image processing device 100. The image processing device 100 performs an image process depending on a job from an external radio communication terminal 200 or the like, the job requesting the image process such as printing or scanning. The image processing device 100 includes a first radio communication unit and a second radio communication unit. The image processing device 100 is directly connected to the radio communication terminal 200 by the first radio communication unit and is connected to the radio communication terminal 200 by the second radio communication unit via a wireless access point 300.

A smartphone, a tablet terminal, or the like may be applied to the radio communication terminal 200. The radio communication terminal 200 includes a first radio communication unit and a second radio communication unit. The radio communication terminal 200 is directly connected to the image processing device 100 by the first radio communication unit and is connected to the image processing device 100 by the second radio communication unit via the wireless access point 300. It is possible to use an NFC reader/writer instead of the first radio communication unit.

The wireless access point 300 builds a communication path between the image processing device 100 and the radio communication terminal 200. The wireless access point 300 is connected to a Local Area Network (LAN) 50 such as Ethernet (registered trademark) and communicates with the radio communication terminal 200 in accordance with a standard of the wireless LAN such as IEEE 802.11. Instead of the wireless access point 300, the image processing device 100 may include a Wi-Fi module that operates in an infrastructure mode or a Wi-Fi direct module capable of being directly connected to the radio communication terminal 200 and performing communication. In this case, the radio communication terminal 200 can be connected to the image processing device 100 without the wireless access point 300 and perform communication, so that it is possible to eliminate the wireless access point 300.

<Image Processing Device 100>

Figure 2:
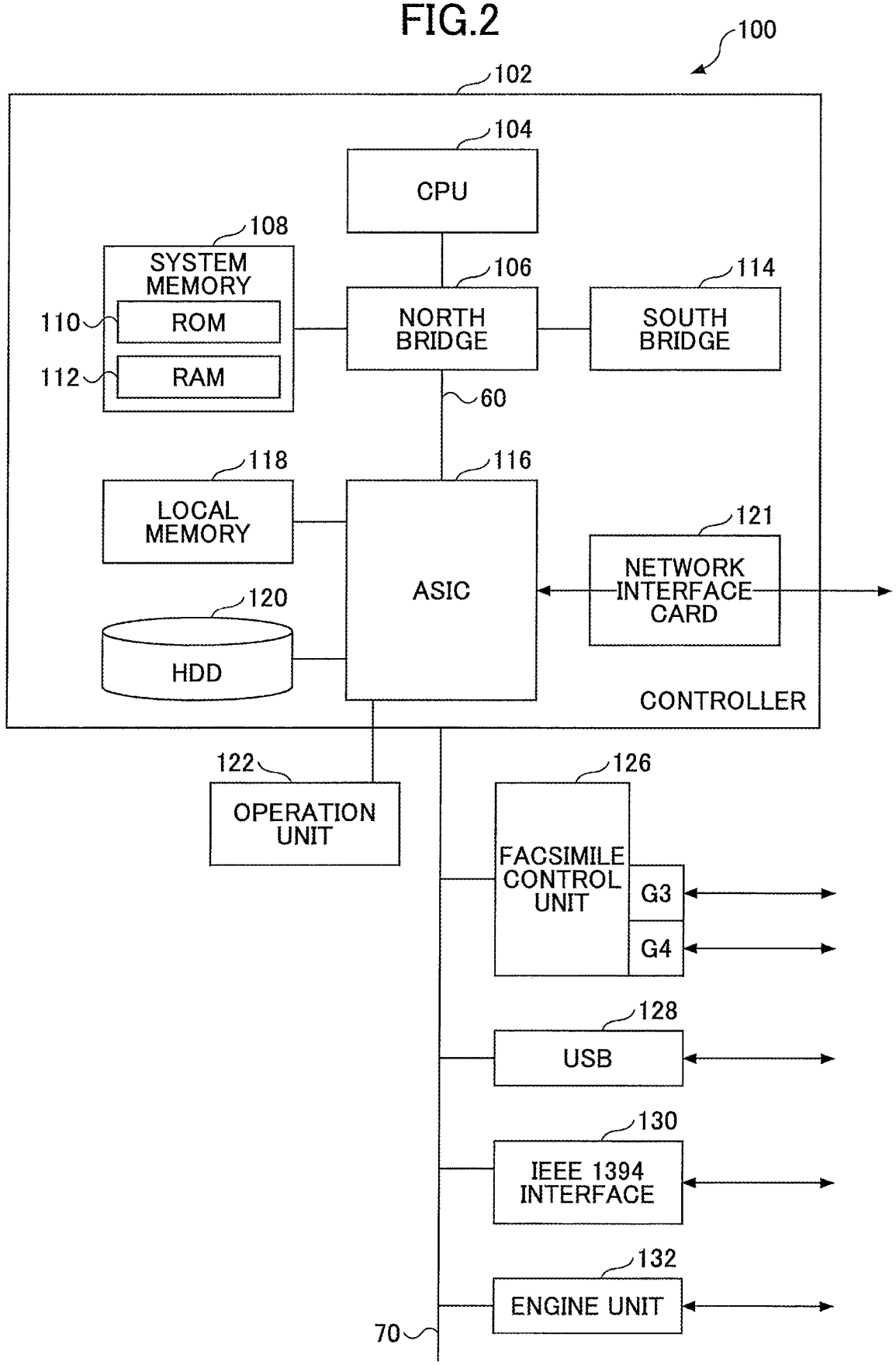
FIG. 2 is a diagram showing a hardware configuration of an image processing device according to the embodiments.

FIG. 2 is a diagram showing a hardware configuration of the image processing device 100 according to the embodiments.

The image processing device 100 includes a controller 102, an operation unit 122, a Facsimile Control Unit (FCU) 126, a Universal Serial Bus (USB) 128, an Institute of Electrical and Electronic Engineers (IEEE) 1394 interface 130, and an engine unit 132. In the image processing device 100, elements other than the operation unit 122 may be referred to as a main body unit.

The controller 102 includes a Central Processing Unit (CPU) 104, a North Bridge (NB) 106, a system memory (MEM-P) 108, a South Bridge (SB) 114, an Application Specific Integrated Circuit (ASIC) 116, a local memory (MEM-C) 118, an HDD 120, and a Network Interface Card (NIC) 121. The system memory 108 includes a Read Only Memory (ROM) 110 and a Random Access Memory (RAM) 112.

The CPU 104 controls the whole image processing device 100 and constitutes a chipset together with the north bridge 106, the system memory 108, and the south bridge 114. The CPU 104 is connected to another device via this chipset. The north bridge 106 is a bridge connected among the CPU 104, the system memory 108, the south bridge 114, and an Accelerated Graphics Port (AGP) bus 60. The north bridge 106 includes a memory controller for controlling reading or writing on the system memory 108, a Peripheral Component Interface master (PCI) master, and an AGP target.

The AGP bus 60 is an interface provided to speed up a graphic process. The AGP bus 60 speeds up an image process by directly accessing the system memory 108 at high throughput.

The ROM 110 of the system memory 108 is a read-only memory that stores a program or data for an image processing device. The RAM 112 of the system memory 108 is a writable and readable memory which is used to load the program or data for an image processing device and is also used to when a rendering process is performed by a printer. The south bridge 114 is a bridge connected between the north bridge 106 and a peripheral device such as a PCI device. The south bridge 114 is connected to the north bridge 106 via a PCI bus. It is possible to connect a network interface (I/F) to the PCI bus.

The ASIC 116 is an Integrated Circuit (IC) for image processing having a hardware element for image processing.

The ASIC 116 functions as a bridge to connect the AGP bus 60, a PCI bus 70, the HDD 120, and the local memory 118. The ASIC 116 includes a PCI target and an AGP master, an arbiter (ARB) that functions as a core of the ASIC 116, a memory controller that controls the local memory 118, a plurality of Direct Memory Access Controllers (DMAC) that rotate image data using hardware logic, and a PCI unit that transfers data with the engine unit 132 via the PCI bus 70. To the ASIC 116, the operation unit 122, the Facsimile Control Unit 126, the USB 128, the IEEE 1394 interface 130, and the engine unit 132 are connected via the PCI bus 70.

The local memory 118 is used as an image buffer and a code buffer for copying. The HDD 120 stores image data, programs, font data, and forms. The HDD 120 also stores a license of an application executed in the image processing device 100. The NIC 121 is an interface to connect to a network such as the LAN 50.

The operation unit 122 is directly connected to the ASIC 116 and is an interface for a user such as an operator who operates the image processing device 100. By operating the operation unit 122, it is possible to input data, execute a job and display images, for example.

The Facsimile Control Unit 126 is connected to the PCI bus 70 and controls communication with an external device such as a FAX device or a copying device having a modem function in a public line. Each of the USB 128 and the IEEE 1394 interface 130 is connected to the PCI bus 70 to be able to connect to a peripheral device. The engine unit 132 is connected to the PCI bus 70 and may use a printer engine such as a black-and-white plotter, a color plotter with a single drum, a color plotter with four drums, a scanner, a fax unit, or the like. In addition, the engine unit 132 may include an image processing unit for error diffusion or gamma transformation.

<Operation Unit 122>

Figure 3:
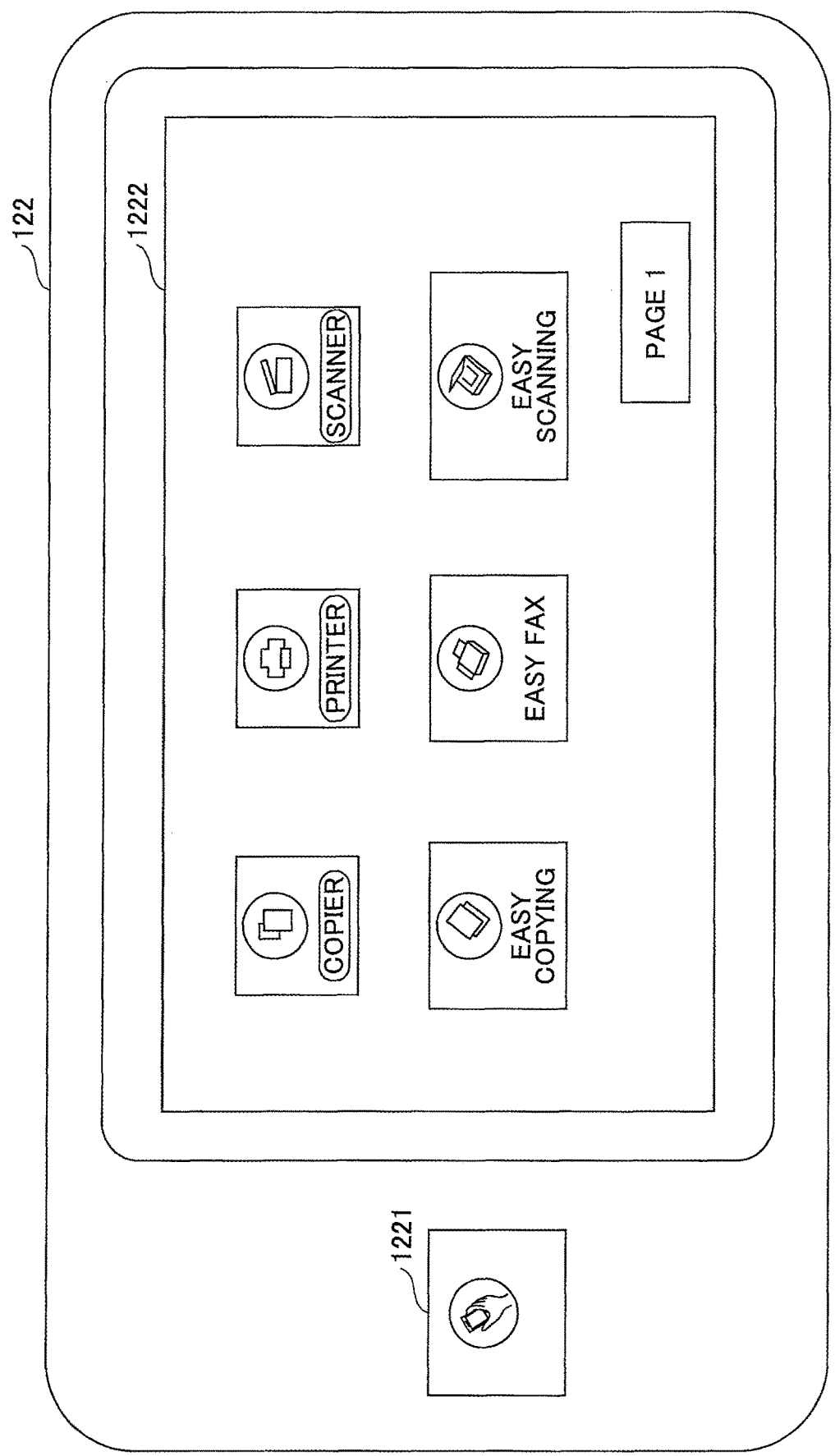
FIG. 3 is a diagram illustrating an appearance of an operation unit of an image processing device according to the embodiments.

FIG. 3 is a diagram illustrating an appearance of the operation unit 122 of the image processing device 100 according to the embodiments. As shown in FIG. 3, a field 1221 where the radio communication terminal 200 is held and a display field 1222 are provided on the operation unit 122. The user can start operating the image processing device 100 by holding the radio communication terminal 200 above the field 1221. When the radio communication terminal 200 is held above the field 1221, a status indicating that the process is in progress is displayed in the display field 1222. In this case, from the radio communication terminal 200 to the operation unit 122, functions to use such as copying and scanning set by the user in the radio communication terminal 200 and contents set along with the functions are reported. In accordance with this, the user is capable of using the image processing device 100 without performing an operation on the display field 1222.

By contrast, if the user performs a normal operation such as the use of the image processing device 100 without using the radio communication terminal 200, the user selects one of a plurality of application icons displayed on a HOME screen displayed in the display field 1222. In accordance with this, the user is capable of starting the selected app.

Figure 4:
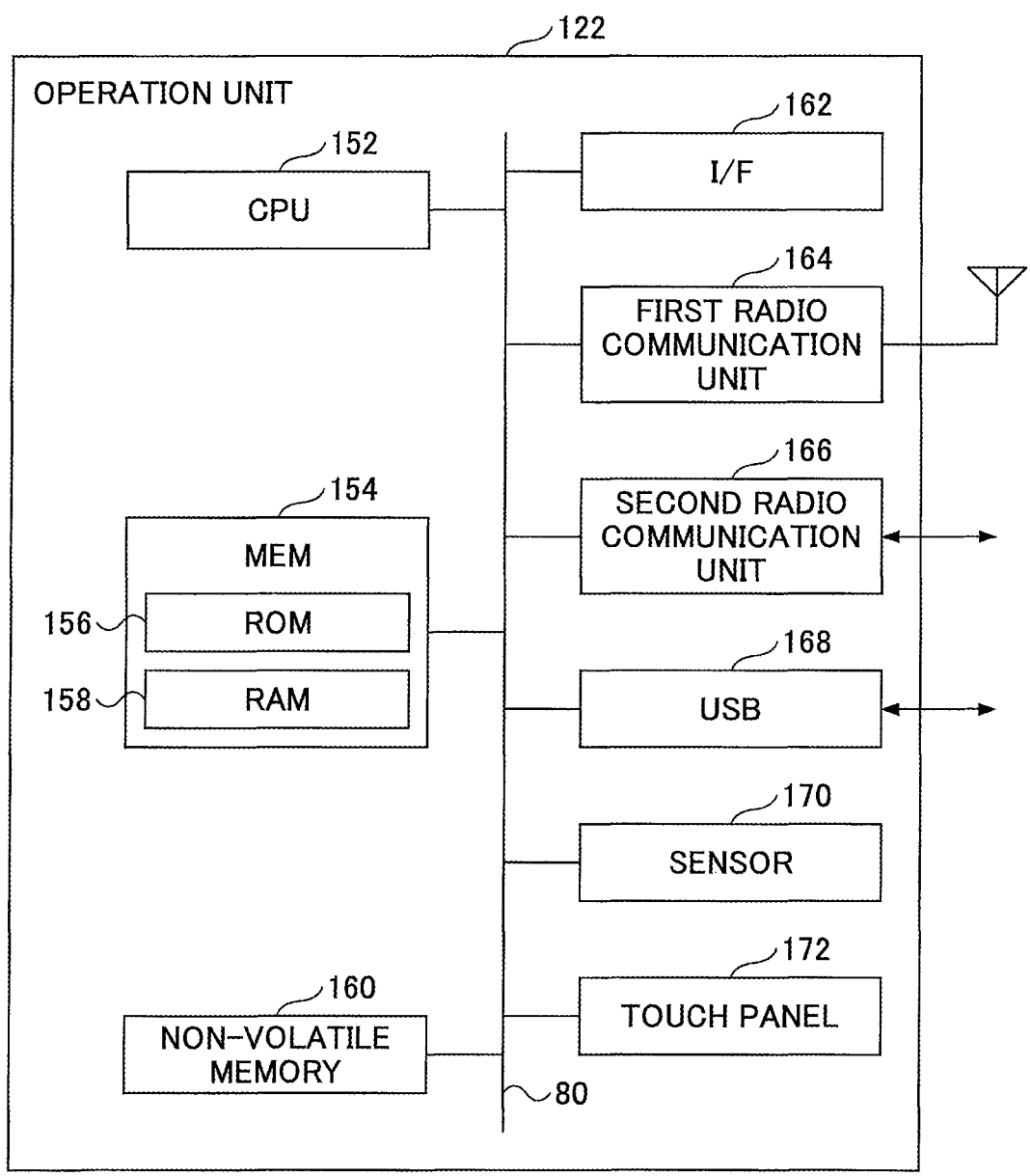
FIG. 4 is a diagram showing a hardware configuration of an operation unit of an image processing device according to the embodiments.

FIG. 4 is a diagram showing a hardware configuration of the operation unit 122 of the image processing device 100 according to the embodiments. The operation unit 122 may use a typical information processing terminal and includes a CPU 152, a memory (MEM) 154, a non-volatile memory 160, an I/F 162, a first radio communication unit 164, a second radio communication unit 166, a USB 168, a sensor 170, and a touch panel 172. The CPU 152, the memory 154, the non-volatile memory 160, the I/F 162, the first radio communication unit 164, the second radio communication unit 166, the USB 168, the sensor 170, and the touch panel 172 are connected via a bus 80.

The CPU 152 controls the whole operations of the operation unit 122. The memory 154 includes a ROM 156 and a RAM 158. The ROM 156 is a read-only non-volatile storage medium and stores a program such as firmware. The RAM 158 is a volatile storage medium capable of reading and writing information at high speed and is used as a work area when the CPU 152 processes information.

The non-volatile memory 160 is a non-volatile storage medium of NAND type or the like capable of reading and writing information and stores an Operating System (OS), various control programs, application programs, and the like. The I/F 162 connects between the bus 80, various hardware, and a network such as the LAN 50.

The first radio communication unit 164 performs radio communication in a first radio communication method, such as Bluetooth (registered trademark) 4.0, Bluetooth Low Energy (BLE), or short-range radio communication (Near Field Communication (NFC)), at lower speed compared with a second radio communication method.

The second radio communication unit 166 is connected to the wireless access point 300 via the LAN 50. The second radio communication unit 166 performs a process for radio communication in accordance with a standard of the second radio communication method such as a wireless LAN via the wireless access point 300, the radio communication being performed at higher speed compared with the first radio communication method.

The USB 168 can connect a peripheral device. The sensor 170 is implemented with hardware such as an acceleration sensor. The touch panel 172 is a visual user interface for a user to confirm a status of the image processing device 100. The touch panel 172 is also used when an operation is performed.

It is possible to connect between the operation unit 122 and the ASIC 116 via the I/F 162 or the USB 168.

Further, the first radio communication unit 164 and the second radio communication unit 166 may be included in the main body unit instead of the operation unit 122 or may be included in both the operation unit 122 and the main body unit.

<Functional Configuration in Embodiments>

Figure 5:
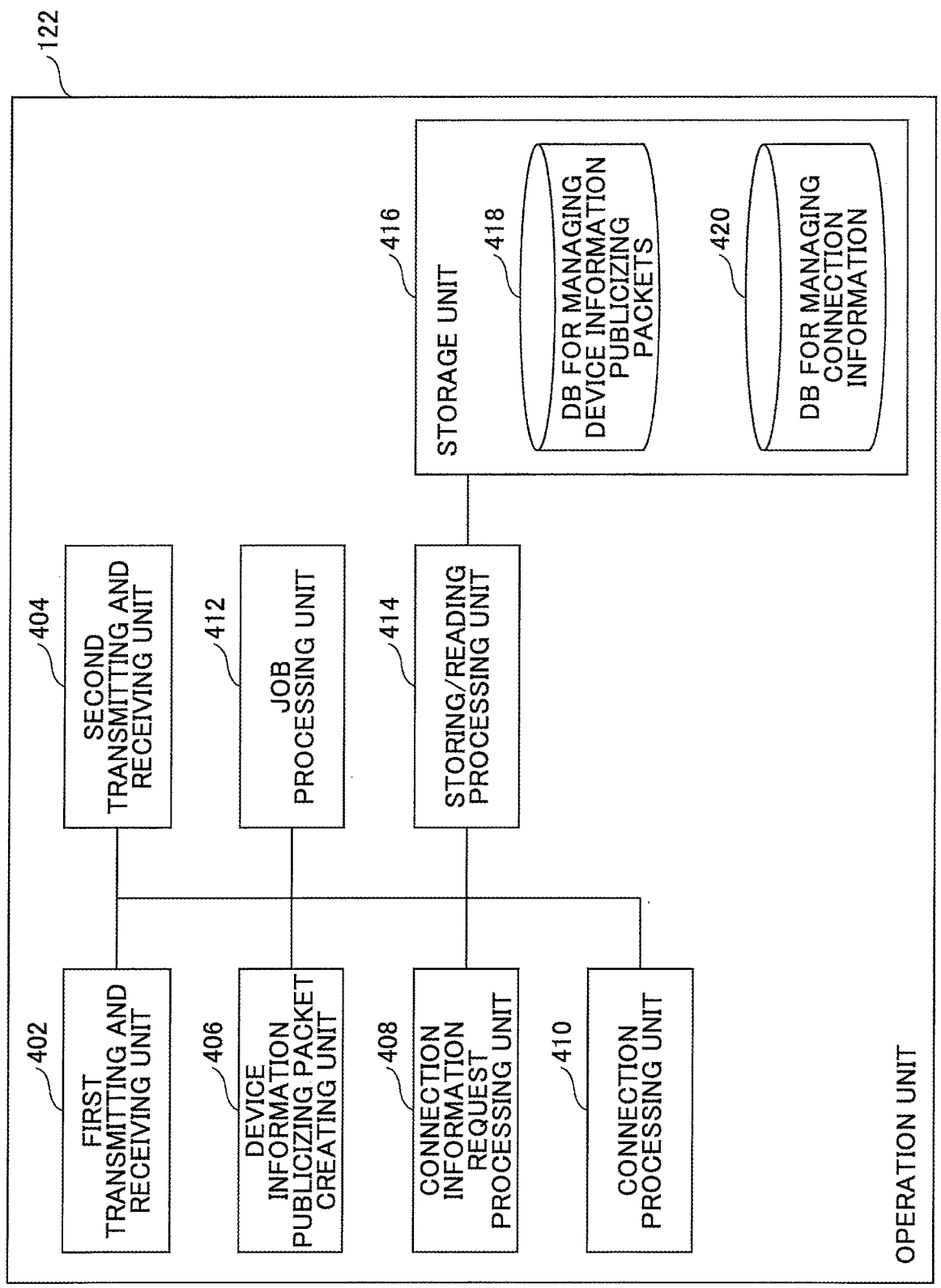
FIG. 5 is a functional block diagram of an operation unit of an image processing device according to the embodiments.

In the following, a functional configuration in the present embodiments is described. FIG. 5 is a functional block diagram of the operation unit 122 constituting the image processing device 100.

The operation unit 122 includes a first transmitting and receiving unit 402, a second transmitting and receiving unit 404, a device information publicizing packet creating unit 406, a connection information request processing unit 408, a connection processing unit 410, a job processing unit 412, and a storing/reading processing unit 414. Each of these units serves as a function or a unit to be implemented when any one of constituent elements shown in FIG. 4 operates by an instruction from the CPU 152 in accordance with an operation unit program stored in the non-volatile memory 160. Further, the operation unit 122 includes a storage unit 416 constructed with the non-volatile memory 160 shown in FIG. 4.

(Table for Managing Device Information Publicizing Packets)

In the storage unit 416, a DB 418 for managing device information publicizing packets with a table for managing the device information publicizing packets as shown in Table 1, is constructed.

TABLE 1

Table for managing device information publicizing packets

| Device name | Operation mode | Output power level (W) | Received signal strength (dB) |
|---|---|---|---|
| aaa | Dual mode | XXX | YYY |

In the table for managing device information publicizing packets, a device name, an operation mode, an output power level, and received signal strength are associated. The device name is used for plug and play of the image processing device 100. The operation mode indicates a standard supported by the first radio communication unit 164. For example, if the first radio communication unit 164 supports Bluetooth 4.0, either a dual mode or a single mode is stored. The output power level indicates output intensity of radio waves transmitted by the image processing device 100. This output power level may have a fixed value or a variable value.

If the output power level has a fixed value, it is possible to estimate a distance between the image processing device 100 and the radio communication terminal 200 based on a received signal level of a device information publicizing packet in the image processing device 100. Further, if the output power level has a variable value, it is possible to obtain a path loss based on the output power level and a received signal level of a device information publicizing packet in the image processing device 100, and to estimate a distance between the image processing device 100 and the radio communication terminal 200. The received signal strength is observed by an antenna of the radio communication terminal 200 when the radio communication terminal 200 receives the device information publicizing packet.

(Table for Managing Connection Information)

In the storage unit 416, a DB 420 for managing connection information with a table for managing the connection information as shown in Table 2 is constructed.

TABLE 2

Table for managing connection information

| SSID | Security method | Password | IP address | Port number |
|---|---|---|---|---|
| zzzzzz | WPA2 | wwwwww | 192.168.10.10 | αα |

The table for managing connection information stores connection information to be used if the second radio communication unit 166 and the radio communication terminal 200 are connected in the second radio communication method. In the table for managing connection information, network information such as a Service Set Identifier (SSID), a security method, and a password is associated with connection information such as address information including an IP address and a port number, for example. The SSID includes identification information in a wireless LAN and the security method is represented by a standard of encryption such as WEP, WPA, WPA2, WPA2-TKIP, AES, or the like.

<Functional Units of Operation Unit 122>

In the following, each unit of the operation unit 122 is described in detail.

The first transmitting and receiving unit 402 of the operation unit 122 is implemented with the first radio communication unit 164 and an instruction from the CPU 152 shown in FIG. 4. The first transmitting and receiving unit 402 transmits and receives various data (information) to and from the radio communication terminal 200 in accordance with a standard of the first radio communication method.

The second transmitting and receiving unit 404 of the operation unit 122 is implemented with the second radio communication unit 166 and an instruction from the CPU 152 shown in FIG. 4. The second transmitting and receiving unit 404 performs a process to transmit and receive various data (information) to and from the radio communication terminal 200 in accordance with a standard of the second radio communication method.

The storing/reading processing unit 414 of the operation unit 122 is implemented with an instruction from the CPU 152 and an operation unit program stored in the non-volatile memory 160 shown in FIG. 4. The storing/reading processing unit 414 performs a process to store various data in the storage unit 416 and read various data stored in the storage unit 416.

The device information publicizing packet creating unit 406 of the operation unit 122 is implemented with an instruction from the CPU 152. The device information publicizing packet creating unit 406 creates a device information publicizing packet including information stored in the table for managing device information publicizing packets of the DB 418 for managing device information publicizing packets. The device information publicizing packet is a packet, such as an advertisement packet, to publicize presence of the image processing device 100 to the radio communication terminal 200. The device information publicizing packet creating unit 406 transmits a created device information publicizing packet from the first transmitting and receiving unit 402.

The connection information request processing unit 408 of the operation unit 122 is implemented with an instruction from the CPU 152. A connection information request transmitted by the radio communication terminal 200 that has received the device information publicizing packet is input to the connection information request processing unit 408 from the first transmitting and receiving unit 402. When the connection information request is input, the connection information request processing unit 408 creates connection information including information stored in the table for managing connection information of the DB 420 for managing connection information in accordance with the connection information request and transmits the connection information from the first transmitting and receiving unit 402.

The connection processing unit 410 of the operation unit 122 is implemented with an instruction from the CPU 152. When a connection request transmitted by the radio communication terminal 200 that has received connection information is input from the second transmitting and receiving unit 404, the connection processing unit 410 performs a connection process with the radio communication terminal 200 in accordance with the connection request.

The job processing unit 412 of the operation unit 122 is implemented with an instruction from the CPU 152. When a job requested by the radio communication terminal 200 is input from the second transmitting and receiving unit 404, the job processing unit 412 processes the job.

<Radio Communication Terminal 200>

Figure 6:
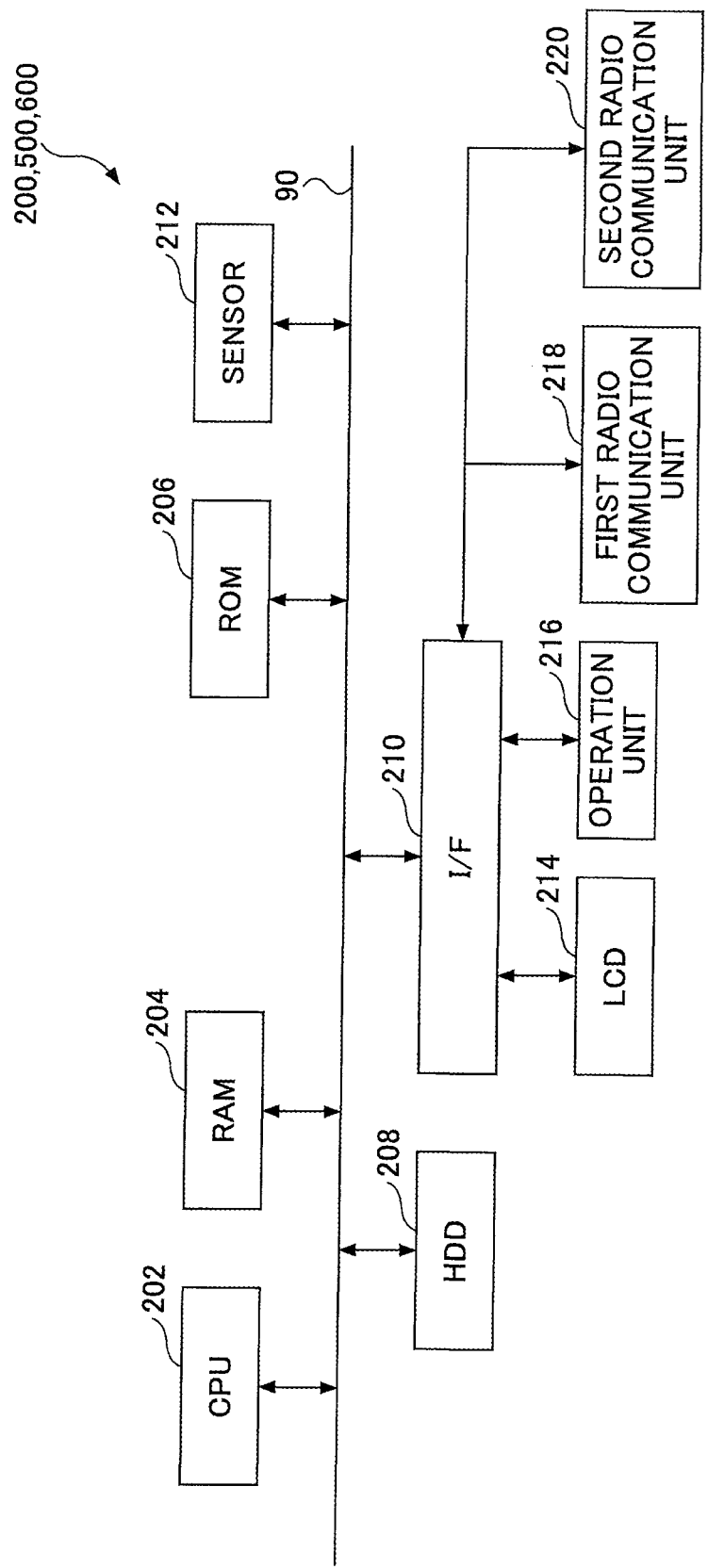
FIG. 6 is a diagram showing a hardware configuration of a radio communication terminal according to the embodiments.

FIG. 6 is a diagram showing a hardware configuration of the radio communication terminal 200 according to the embodiments. The radio communication terminal 200 includes a CPU 202, a RAM 204, a ROM 206, an HDD 208, an I/F 210, a sensor 212, a Liquid Crystal Display (LCD) 214, an operation unit 216, a first radio communication unit 218, and a second radio communication unit 220. The CPU 202, the RAM 204, the ROM 206, the HDD 208, the I/F 210, and the sensor 212 are connected via a bus 90.

The CPU 202 controls the whole radio communication terminal 200. The ROM 206 is a read-only non-volatile storage medium and stores a program such as firmware. The RAM 204 is a volatile storage medium capable of reading and writing information at high speed and is used as a work area when the CPU 202 processes information. The HDD 208 is a non-volatile storage medium capable of reading and writing information and stores an OS, various control programs, application programs, and the like.

The I/F 210 connects the bus 90 to various hardware and networks. The sensor 212 is implemented with hardware such as an acceleration sensor. The LCD 214 is a visual user interface for a user to confirm a status of the radio communication terminal 200. The operation unit 216 is a user interface, such as a keyboard or a mouse, for the user to input information to the radio communication terminal 200. The LCD 214 and the operation unit 216 may be constructed with a touch panel and the keyboard may be implemented with software.

The first radio communication unit 218 performs radio communication in the first radio communication method, such as Bluetooth 4.0 or short-range radio communication, at lower speed compared with the second radio communication method.

The second radio communication unit 220 performs radio communication in accordance with the standard of the second radio communication method such as a wireless LAN, the radio communication being performed at higher speed compared with the first radio communication method.

<Functional Configuration in Embodiments>

Figure 7:
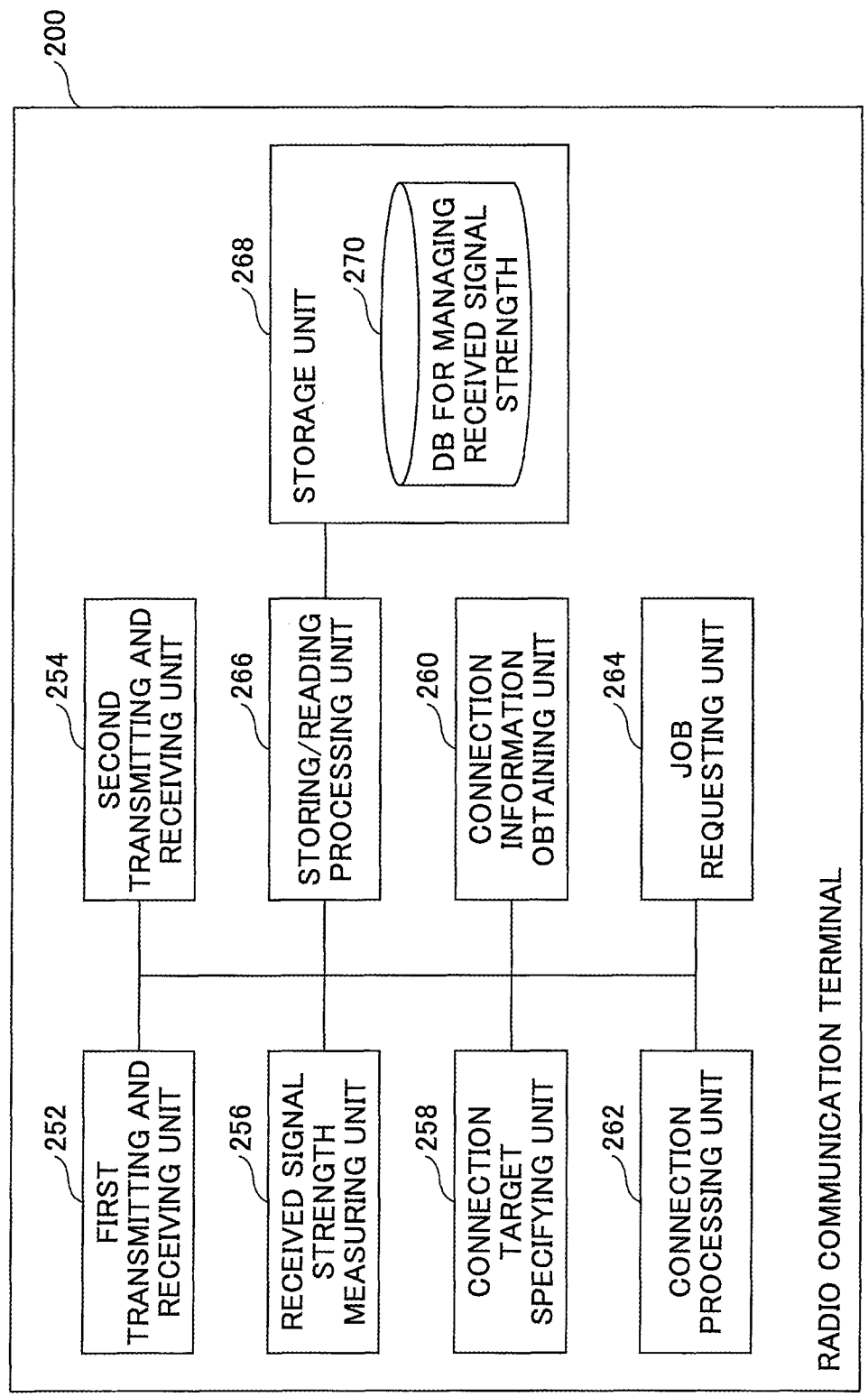
FIG. 7 is a functional block diagram of a radio communication terminal according to the embodiments.

In the following, a functional configuration of the radio communication terminal 200 according to the embodiments is described. FIG. 7 is a functional block diagram of the radio communication terminal 200.

The radio communication terminal 200 includes a first transmitting and receiving unit 252, a second transmitting and receiving unit 254, a received signal strength measuring unit 256, a connection target specifying unit 258 a connection information obtaining unit 260, a connection processing unit 262, a job requesting unit 264, and a storing/reading processing unit 266. Each of these units serves as a function or a unit to be implemented when any one of constituent elements shown in FIG. 6 operates by an instruction from the CPU 202 in accordance with a radio communication terminal program stored in the HDD 208. Further, the radio communication terminal 200 includes a storage unit 268 constructed with the HDD 208 shown in FIG. 6.

(Table for Managing Received Signal Strength)

In the storage unit 268, a DB 270 for managing received signal strength with a table for managing received signal strength as shown in Table 3 is constructed.

TABLE 3

Table for managing received signal strength

| Device name | Received signal strength (dB) | | |
|---|---|---|---|
| A | −38 | −42 | −40 |
| B | −25 | −24 | −26 |
| C | −50 | −60 | −53 |
| — | — | — | — |

In the table for managing received signal strength, a device name, received signal strength, and the like are associated. The device name is used for plug and play of the image processing device 100, but may be changed afterward. The received signal strength indicates received signal strength of device information publicizing packets that have been transmitted by the image processing device 100. In the table for managing received signal strength, a queue for received signal strength of device information publicizing packets is created for each device name. Table 3 shows that the received signal strength of device information publicizing packets changes to −40 dB, −42 dB, and −38 dB, the packets being transmitted by the image processing device 100 represented by "A" in the device name.

<Functional Units of Radio Communication Terminal 200>

In the following, each unit of the radio communication terminal 200 is described in detail. The first transmitting and receiving unit 252 of the radio communication terminal 200 is implemented with the first radio communication unit 218 and an instruction from the CPU 202 shown in FIG. 6. The first transmitting and receiving unit 252 transmits and receives various data (information) to and from the image processing device 100 in accordance with the standard of the first radio communication method.

The second transmitting and receiving unit 254 of the radio communication terminal 200 is implemented with the second radio communication unit 220 and an instruction from the CPU 202 shown in FIG. 6. The second transmitting and receiving unit 254 transmits and receives various data (information) to and from the image processing device 100 in accordance with the standard of the second radio communication method.

The storing/reading processing unit 266 of the radio communication terminal 200 is implemented with an instruction from the CPU 202 and the radio communication terminal program stored in the HDD 208 shown in FIG. 6. The storing/reading processing unit 266 performs a process to store various data in the storage unit 268 and read various data stored in the storage unit 268.

The received signal strength measuring unit 256 of the radio communication terminal 200 is implemented with an instruction from the CPU 202 and the radio communication terminal program stored in the HDD 208. The received signal strength measuring unit 256 measures received signal strength of a device information publicizing packet in a predetermined cycle, the packet being received by the first transmitting and receiving unit 252, and inputs the received signal strength together with a device name included in the device information publicizing packet to the storing/reading processing unit 266. The storing/reading processing unit 266 stores, in the DB 270 for managing received signal strength of the storage unit 268, the device name and the received signal strength input by the received signal strength measuring unit 256. When the device name and the received signal strength are stored in the DB 270 for managing received signal strength of the storage unit 268, it is possible to store the received signal strength in accordance with First In, First Out (FIFO) for each device name. In the following, a specific description is given with reference to the table for managing received signal strength shown in Table 3. For example, it is assumed that received signal strength of device information publicizing packets that has been newly measured is to be stored, the packets being transmitted by an image processing device whose device name is "B." In this case, the storing/reading processing unit 266 extracts and deletes the oldest value for the device name "B" from the table for managing received signal strength and adds the received signal strength of device information publicizing packets as the latest value for the device name "B."

The connection target specifying unit 258 of the radio communication terminal 200 is implemented with an instruction from the CPU 202 and the radio communication terminal program stored in the HDD 208. The connection target specifying unit 258 causes the storing/reading processing unit 266 to read the table for managing received signal strength in the DB 270 for managing received signal strength of the storage unit 268, and specifies an image processing device to connect based on received signal strength stored in the table for managing received signal strength.

Figure 8:
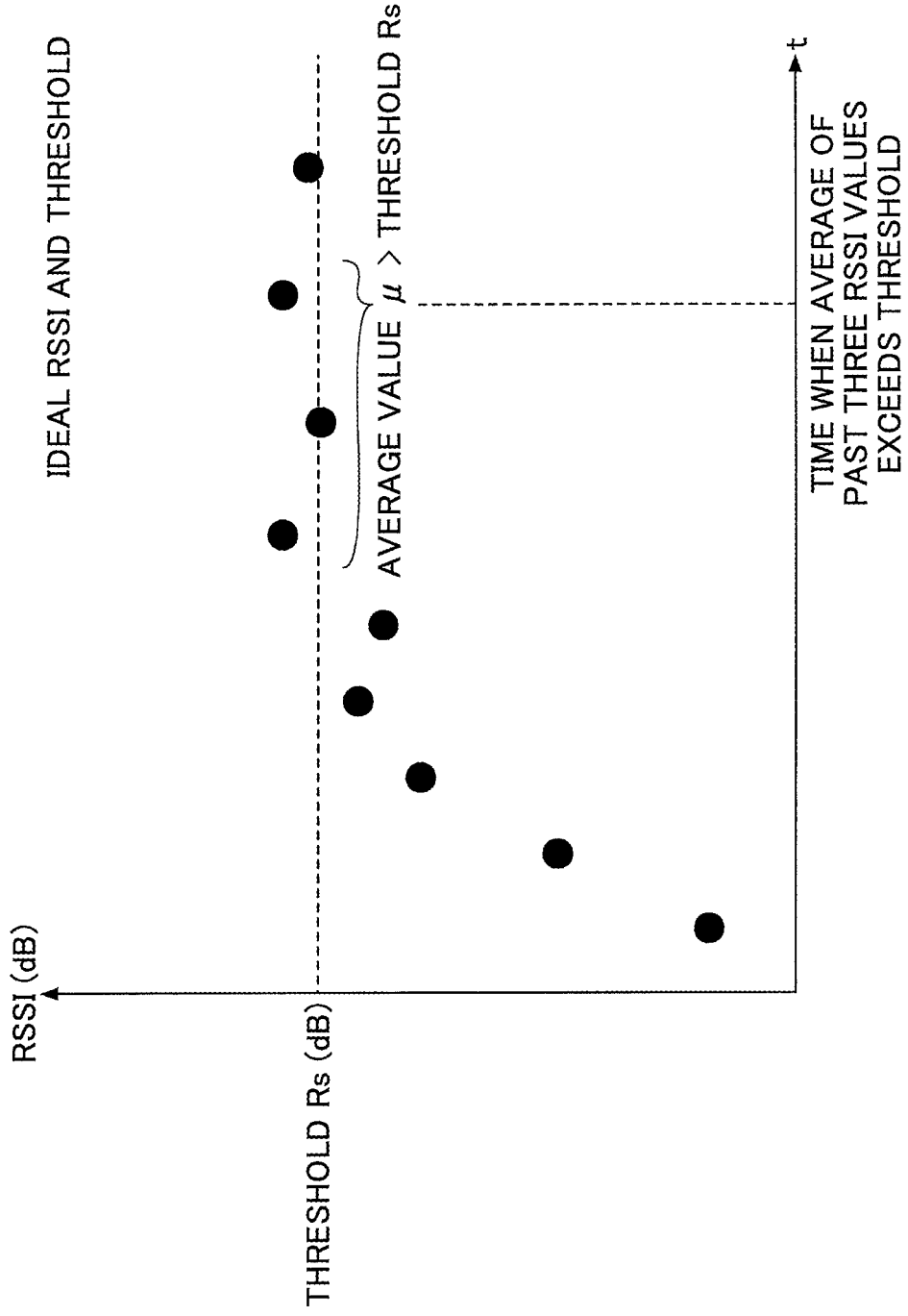
FIG. 8 is a graph showing a temporal change (1) of received signal strength of device information publicizing packets received by a radio communication terminal.

FIG. 8 is a graph showing a temporal change (1) of received signal strength of device information publicizing packets received by the radio communication terminal 200 when a user holding the radio communication terminal 200 approaches the image processing device 100. In FIG. 8, an abscissa indicates time (t) and an ordinate indicates received signal strength (RSSI) of device information publicizing packets.

If the radio communication terminal 200 is moved toward the image processing device 100, received signal strength of device information publicizing packets received by the radio communication terminal 200 is likely to become higher. Further, the received signal strength of device information publicizing packets received by the radio communication terminal 200 is likely to become a constant value when a distance between the first radio communication unit 164 of the image processing device 100 and the first radio communication unit 218 of the radio communication terminal 200 becomes about several centimeters. In addition, the constant value may differ slightly depending on antenna characteristics of the radio communication terminal 200.

The connection target specifying unit 258 determines, based on received signal strength of device information publicizing packets stored in the table for managing received signal strength, whether there is an image processing device whose average value μ (dB) of the received signal strength of device information publicizing packets exceeds a threshold Rs (dB). The connection target specifying unit 258 obtains the average value μ (dB) from a suitable sampling number such as three device information publicizing packets and determines whether the average value μ exceeds the threshold Rs. Further, the connection target specifying unit 258 determines an image processing device whose average value μ of received signal strength of device information publicizing packets exceeds the threshold Rs (dB) as being present just in front of the radio communication terminal 200. Further, the connection target specifying unit 258 specifies, as a connection target, the image processing device determined as being present just in front of the radio communication terminal 200, and reports a device name of the image processing device to the connection information obtaining unit 260.

Returning to FIG. 7, the connection information obtaining unit 260 of the radio communication terminal 200 is implemented with an instruction from the CPU 202 and the radio communication terminal program stored in the HDD 208. The connection information obtaining unit 260 creates, based on the device name reported by the connection target specifying unit 258, a connection information request for an image processing device that corresponds to the device name as a destination, and transmits the connection information request from the first transmitting and receiving unit 252. Further, if a job requested by the user is input to the job requesting unit 264, the connection information obtaining unit 260 may create a connection information request for an image processing device that corresponds to the device name as a destination and transmit the connection information request from the first transmitting and receiving unit 252 in the same manner. If connection information is input from the first transmitting and receiving unit 252 as a reply to the connection information request, the connection information obtaining unit 260 inputs the connection information to the connection processing unit 262.

The connection processing unit 262 of the radio communication terminal 200 is implemented with an instruction from the CPU 202 and the radio communication terminal program stored in the HDD 208. Based on the connection information input by the connection information obtaining unit 260, the connection processing unit 262 performs a process to switch from the first radio communication method to the second radio communication method resulting from handover and connect between the image processing device as the connection target and the second transmitting and receiving unit 254.

Further, in the radio communication terminal 200, a job requested by the user may be input to the job requesting unit 264 and the radio communication terminal 200 may not transmit a connection information request for an image processing device as a destination, the image processing device corresponding to a device name input by the connection target specifying unit 258. In this case, the connection processing unit 262 may start a process to connect between the image processing device as a connection target and the second transmitting and receiving unit 254 after the job requested by the user is input to the job requesting unit 264. By sharing a key related to encryption between the image processing device 100 and the radio communication terminal 200, the image processing device 100 encrypts connection information and transmits the encrypted connection information and the radio communication terminal 200 decrypts the encrypted connection information.

The job requesting unit 264 of the radio communication terminal 200 is implemented with an instruction from the CPU 202 and the radio communication terminal program stored in the HDD 208. The job requesting unit 264 transmits the job requested by the user from the second transmitting and receiving unit 254 to the image processing device 100.

<Operation of Image Processing System>

Figure 9:
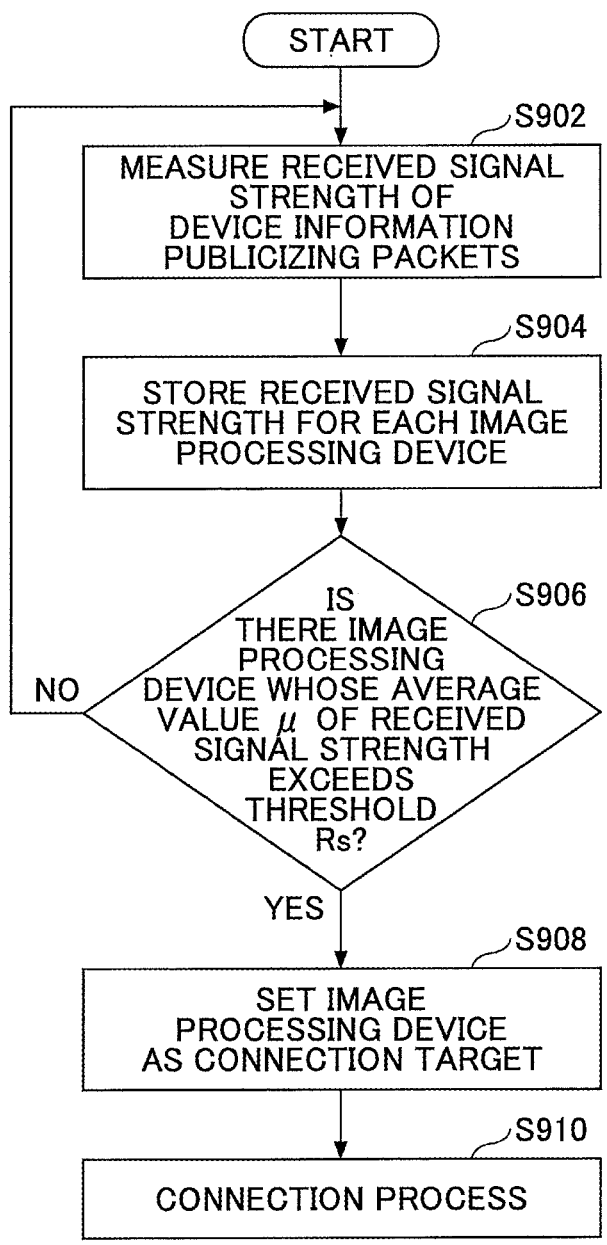
FIG. 9 is a flowchart showing an operation of a radio communication terminal according to the embodiments.

FIG. 9 is a flowchart mainly showing an operation of the radio communication terminal 200 in an image processing system according to the embodiments.

In step S902, the received signal strength measuring unit 256 of the radio communication terminal 200 measures received signal strength of device information publicizing packets received by the first transmitting and receiving unit 252.

In step S904, the received signal strength measuring unit 256 of the radio communication terminal 200 inputs, in the storing/reading processing unit 266, a device name included in the device information publicizing packets and the received signal strength of the device information publicizing packets. In accordance with this, the received signal strength measuring unit 256 stores, in the DB 270 for managing received signal strength of the storage unit 268, the device name included in the device information publicizing packets and the received signal strength of the device information publicizing packets.

In step S906, the connection target specifying unit 258 of the radio communication terminal 200 determines whether there is an image processing device 100 whose average value μ of the received signal strength of device information publicizing packets exceeds the threshold Rs. If there is no image processing device 100 whose average value μ of the received signal strength of device information publicizing packets exceeds the threshold Rs (NO in step S906), the process returns to step S902.

If there is an image processing device 100 whose average value μ of the received signal strength of device information publicizing packets exceeds the threshold Rs (YES in step S906), in step S908, the connection target specifying unit 258 of the radio communication terminal 200 sets the image processing device 100 as a connection target.

In step S910, the connection information obtaining unit 260 of the radio communication terminal 200 sends a connection information request to the image processing device 100 set as the connection target. When connection information (such as an SSID, a password, or an IP address) transmitted by the image processing device 100 set as the connection target is obtained, the connection processing unit 262 of the radio communication terminal 200 uses the connection information to perform a connection process with the image processing device 100.

In addition, the connection process in step S910 may be performed in a procedure below.

For example, in step S910, the image processing device 100 transmits, to the radio communication terminal 200, only information (such as an SSID or a password) to connect to the same network to which the image processing device 100 is connected as the connection information without transmitting information (such as an IP address) to identify the image processing device 100.

The radio communication terminal 200 that has received the connection information from the image processing device 100 transmits information (such as an IP address) to identify the radio communication terminal 200 to the image processing device 100 as the connection target and uses the connection information received from the image processing device 100 in order to connect to the same network to which the image processing device 100 is connected.

The image processing device 100 that has received the information (such as an IP address) to identify the radio communication terminal 200 from the radio communication terminals 200 uses the received information to connect to the radio communication terminal 200.

As another example, the connection process in step S910 may be performed in a procedure below.

For example, in step S910, the image processing device 100 transmits, to the radio communication terminal 200, only information (such as an SSID or a password) to connect to the same network to which the image processing device 100 is connected as the connection information without transmitting information (such as an IP address) to identify the image processing device 100.

The radio communication terminal 200 that has received the connection information from the image processing device 100 uses the connection information received from the image processing device 100 to set up a server on the same network to which the image processing device 100 is connected. The radio communication terminal 200 reports information about an address (such as a URL) from which the radio communication terminal 200 can receive information to the image processing device 100.

The image processing device 100 that has received the address information (such as a URL) from which the radio communication terminal 200 can receive information from the radio communication terminal 200 uses the received address information to report information (such as an IP address) to identify the image processing device 100 to the radio communication terminal 200.

The radio communication terminal 200 that has received the information (such as an IP address) to identify the image processing device 100 from the image processing device 100 uses the received information to connect to the image processing device 100 and sends a request for an image process such as printing.

In this manner, without receiving all the information to connect to the image processing device 100 in the first radio communication method, the radio communication terminal 200 may receive a part of information to connect to the image processing device 100 via the wireless access point 300 and perform a connection process to perform an image process such as printing.

After the connection process is performed in step S910, the job requesting unit 264 of the radio communication terminal 200 transmits a job such as printing or scanning requested by the user to the connected image processing device 100 from the second transmitting and receiving unit 254.

In addition, in step S906 shown in FIG. 9, the connection target specifying unit 258 collectively determines whether there is an image processing device 100 whose average value μ of the received signal strength of device information publicizing packets exceeds the threshold Re. However, this determination may be performed for each image processing device 100. For example, upon each reception of device information publicizing packets from each image processing device 100, the connection target specifying unit 258 may individually calculate an average value μ of the received signal strength from the image processing device 100 and if the calculated average value μ exceeds the threshold Rs, the connection target specifying unit 258 may perform the process in step S908.

In the embodiments, after the connection information is obtained in the first radio communication method, the radio communication terminal 200 may not perform handover from the first radio communication method to the second radio communication method and connect to the image processing device 100 as a connection target in the first radio communication method. After the connection, the radio communication terminal 200 may transmit a job requested by the user from the first transmitting and receiving unit 252 to the connected image processing device 100.

According to the above image processing system, the radio communication terminal 200 measures the received signal strength of device information publicizing packets a plurality of times, the packets being transmitted by the image processing device 100, and if an average value of the received signal strength exceeds a certain threshold, the radio communication terminal 200 transmits a connection information request to the image processing device 100. In accordance with this, it is possible to send an instruction to execute a job to a desired image processing device 100 by only holding the radio communication terminal 200 above the image processing device 100 without operating the image processing device 100 or the radio communication terminal 200.

In the above example, the radio communication terminal 200 measures the received signal strength of device information publicizing packets a plurality of times, and a connection information request is transmitted to an image processing device 100 whose average value of the received signal strength exceeds a certain threshold. However, other than this example, the radio communication terminal 200 may transmit the connection information request to an image processing device 100 whose average value is within a certain range. Alternatively, the radio communication terminal 200 may perform predetermined arithmetic processing on the received signal strength of device information publicizing packets and specify an image processing device 100 to transmit the connection information request to based on a result of the arithmetic processing.

In the above example, the connection target specifying unit 258 of the radio communication terminal 200 determines whether there is an image processing device 100 whose average value μ (dB) of the received signal strength exceeds a certain threshold Rs (dB) based on the received signal strength stored in the table for managing received signal strength. The connection target specifying unit 258 may be caused to determine, based on a standard deviation c in addition to the average value p, whether there is an image processing device 100 whose average value μ exceeds a certain threshold Rs and whose standard deviation c is within a specified range. In accordance with this, it is possible to specify an image processing device 100 to connect to based on radio properties with more improved accuracy.

First Embodiment

FIG. 1 may be applied to an image processing system according to a first embodiment and the image processing system includes a radio communication terminal 500 instead of the radio communication terminal 200. A part of functions of the radio communication terminal in the image processing system according to the first embodiment is different from corresponding functions in the image processing system described in <Outline>.

<Functional Configuration in the First Embodiment>

Figure 10:
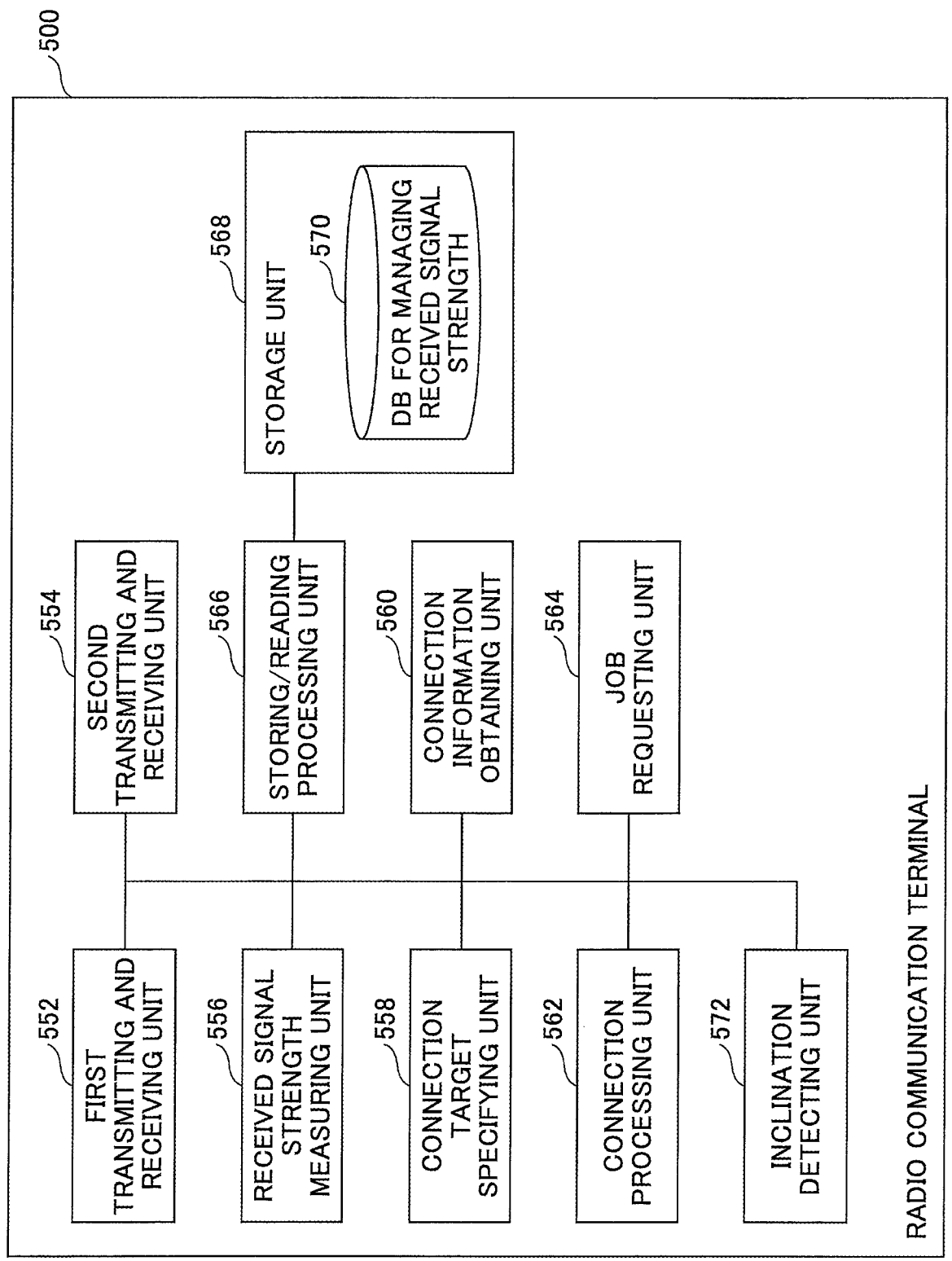
FIG. 10 is a functional block diagram of a radio communication terminal according to a first embodiment.

In the following, a functional configuration is described. FIG. 10 is a functional block diagram of the radio communication terminal 500. The radio communication terminal 500 includes a first transmitting and receiving unit 552, a second transmitting and receiving unit 554, a received signal strength measuring unit 556, a connection target specifying unit 558, a connection information obtaining unit 560, a connection processing unit 562, a job requesting unit 564, a storing/reading processing unit 566, and an inclination detecting unit 572. Each of these units serves as a function or a unit to be implemented when any one of constituent elements shown in FIG. 6 operates by an instruction from the CPU 202 in accordance with the radio communication terminal program stored in the HDD 208. Further, the radio communication terminal 500 includes a storage unit 568 constructed with the HDD 208 shown in FIG. 6.

<Functional Units of Radio Communication Terminal 500>

In the following, each unit of the radio communication terminal 500 is described. The first transmitting and receiving unit 552, the second transmitting and receiving unit 554, the received signal strength measuring unit 556, the connection information obtaining unit 560, the connection processing unit 562, the job requesting unit 564, and the storing/reading processing unit 566 may employ functions of corresponding units of the radio communication terminal 200 shown in FIG. 7.

The inclination detecting unit 572 of the radio communication terminal 500 is implemented with the sensor 212 and an instruction from the CPU 202 shown in FIG. 6. The inclination detecting unit 572 detects an inclination of the radio communication terminal 500 such as an angle or the like based on measurement information such as acceleration measured by the sensor 212.

Figure 11:
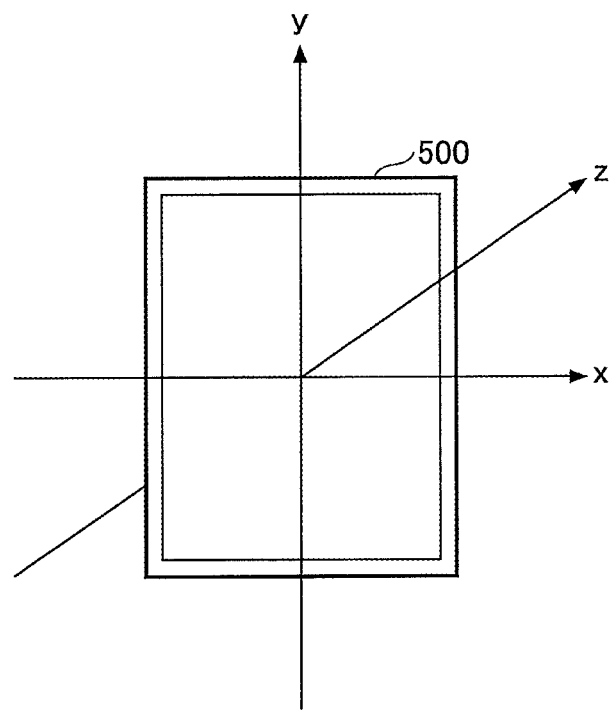
FIG. 11 is a diagram showing acceleration measured in a radio communication terminal.

FIG. 11 is a diagram showing acceleration measured in the radio communication terminal 500. If the sensor 212 employs an acceleration sensor, when an object is moved, the sensor 212 measures acceleration thereof. For example, a longitudinal direction of the LCD 214 of the radio communication terminal 500 is represented by a Y axis, right and left directions of the LCD 214 are represented by an X axis, and a direction orthogonal to a plane defined by the X axis and the Y axis is represented by a Z axis. In this case, the radio communication terminal 500 can obtain acceleration of the radio communication terminal 500 in the right and left directions by detecting acceleration in an X axis direction. Further, the radio communication terminal 500 can obtain acceleration of the radio communication terminal 500 in upward and downward directions by detecting acceleration in a Y axis direction. Further, the radio communication terminal 500 can obtain acceleration of the radio communication terminal 500 in front surface and back surface directions by detecting acceleration in a Z axis direction. The inclination detecting unit 572 determines an inclination of the radio communication terminal 500 such as an angle or the like by determining whether acceleration measured by the sensor 212 is within a certain range.

Figure 12:
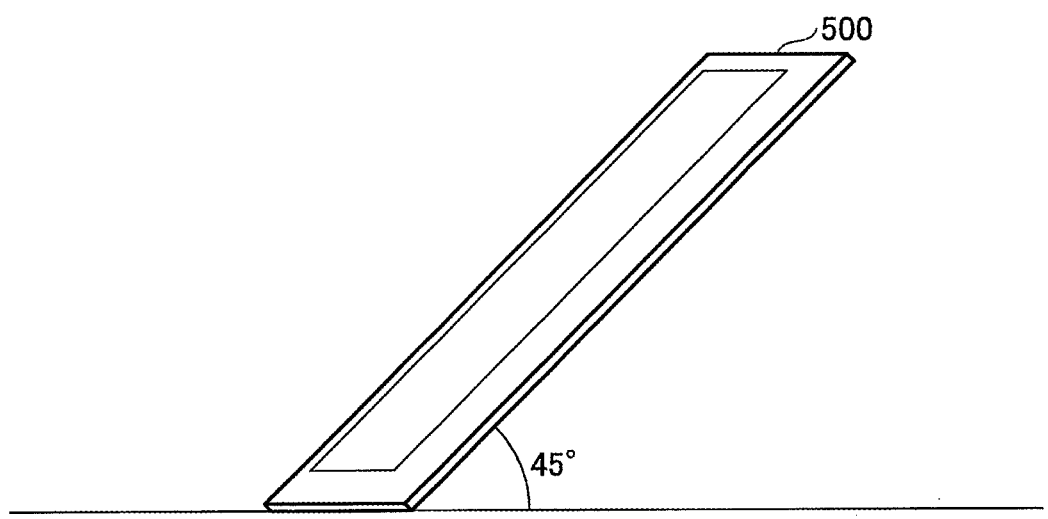
FIG. 12 is a diagram showing an inclination of a radio communication terminal.

FIG. 12 is a diagram showing the radio communication terminal 500 being inclined by 45 degrees from a horizontal direction. In this case, the inclination detecting unit 572 detects that acceleration of the radio communication terminal 500 in the Y axis direction is sin 45°. If the inclination detecting unit 572 detects that the inclination of the radio communication terminal 500 is within a predetermined range, the inclination detecting unit 572 reports this information to the connection target specifying unit 558. The predetermined range here is set in advance based on inclination of the operation unit 122 of the image processing device 100. For example, when the user connects the radio communication terminal 500 to the image processing device 100, in many cases, the user is assumed to hold the radio communication terminal 500 in parallel with a display screen of the touch panel 172 in the operation unit 122. When the radio communication terminal 500 is in parallel the display screen of the touch panel 172, both have the same inclination. Accordingly, the inclination detecting unit 572 determines whether the inclination of the radio communication terminal 500 is within the predetermined range from the inclination of the display screen of the touch panel 172.

In addition, the radio communication terminal 500 stores a value of the inclination of the operation unit 122 of the image processing device 100 (inclination of the display screen of the touch panel 172) in the storage unit 568 in advance, for example.

The connection target specifying unit 558 of the radio communication terminal 500 is implemented with an instruction from the CPU 202 and the radio communication terminal program stored in the HDD 208. The connection target specifying unit 558 causes the storing/reading processing unit 566 to read a table for managing received signal strength in a DB 570 for managing received signal strength of the storage unit 568. Further, the connection target specifying unit 558 specifies an image processing device 100 to connect to based on the received signal strength of device information publicizing packets stored in the table for managing received signal strength and whether the inclination of the radio communication terminal 500 is within a predetermined range is detected. In this case, the predetermined range is set in advance depending on a shape of the image processing device 100 and is stored in the storage unit 568, for example.

The following describes a case where a connection target is specified based on whether an average value μ of the received signal strength of device information publicizing packets exceeds a threshold Rs. Based on a standard deviation a in addition to the average value p, the connection target may be specified based on whether the average value μ exceeds the threshold Rs and whether the standard deviation a is within a specified range.

Figure 13:
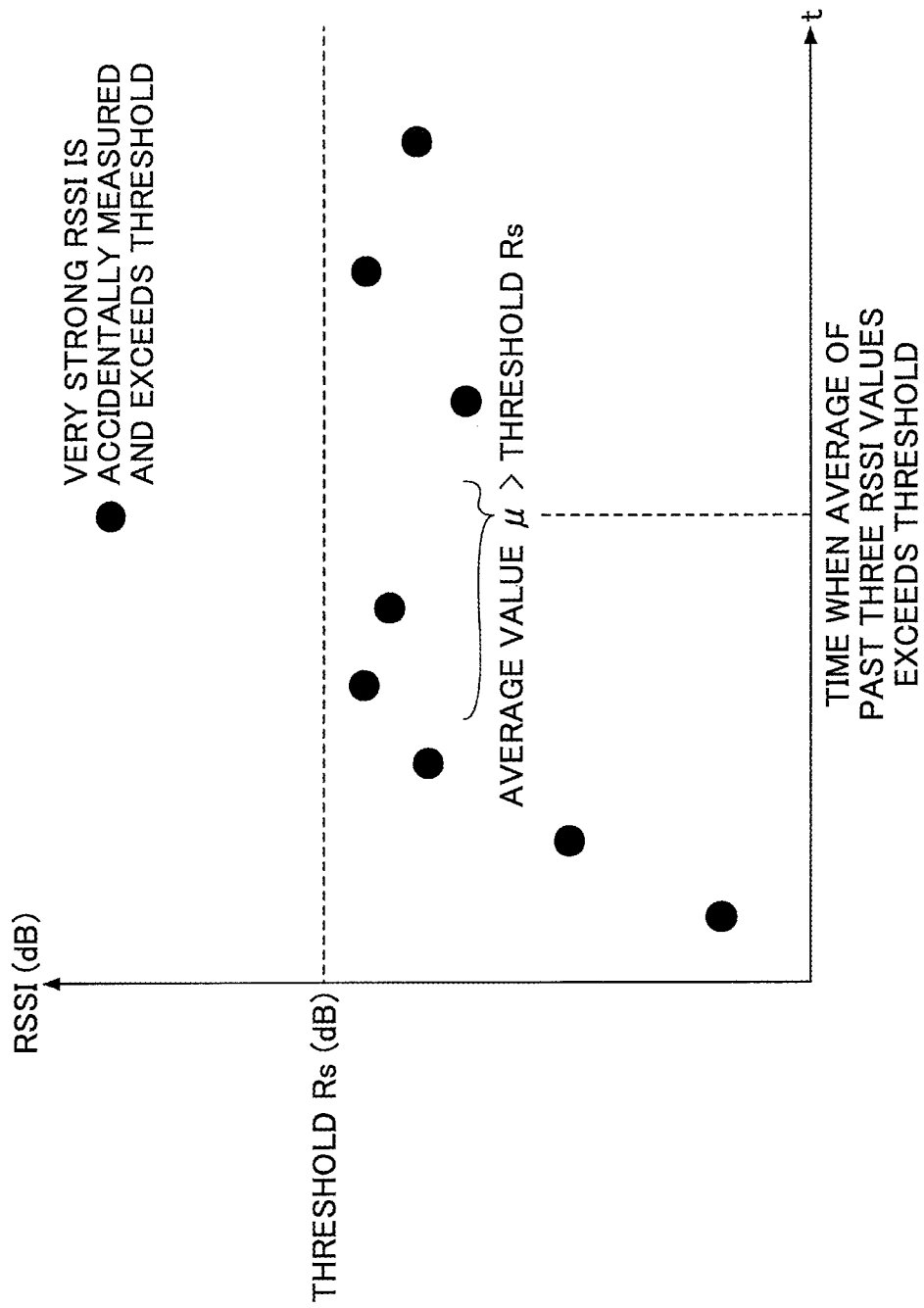
FIG. 13 is a graph showing a temporal change (2) of received signal strength of device information publicizing packets received by a radio communication terminal.

FIG. 13 is a graph showing a temporal change (2) of received signal strength of device information publicizing packets received by the radio communication terminal 200. In FIG. 13, an abscissa indicates time (t) and an ordinate indicates received signal strength (RSSI) of device information publicizing packets. As shown in FIG. 13, depending on antenna characteristics of the radio communication terminal 200, the received signal strength of device information publicizing packets transmitted by the image processing device 100 may be accidentally measured as a value higher than a threshold Re. In this case, because an average value μ of the received signal strength of device information publicizing packets exceeds the threshold Rs, the radio communication terminal 200 may transmit a connection information request to the image processing device 100 and perform a connection process based on connection information transmitted by the image processing device 100. Although this connection process does not cause a problem if the connection process is performed for an image processing device intended by the user, the connection process may cause a problem if the radio communication terminal 200 has been left to be connectable to another image processing device 100, which is not intended by the user.

Figure 14:
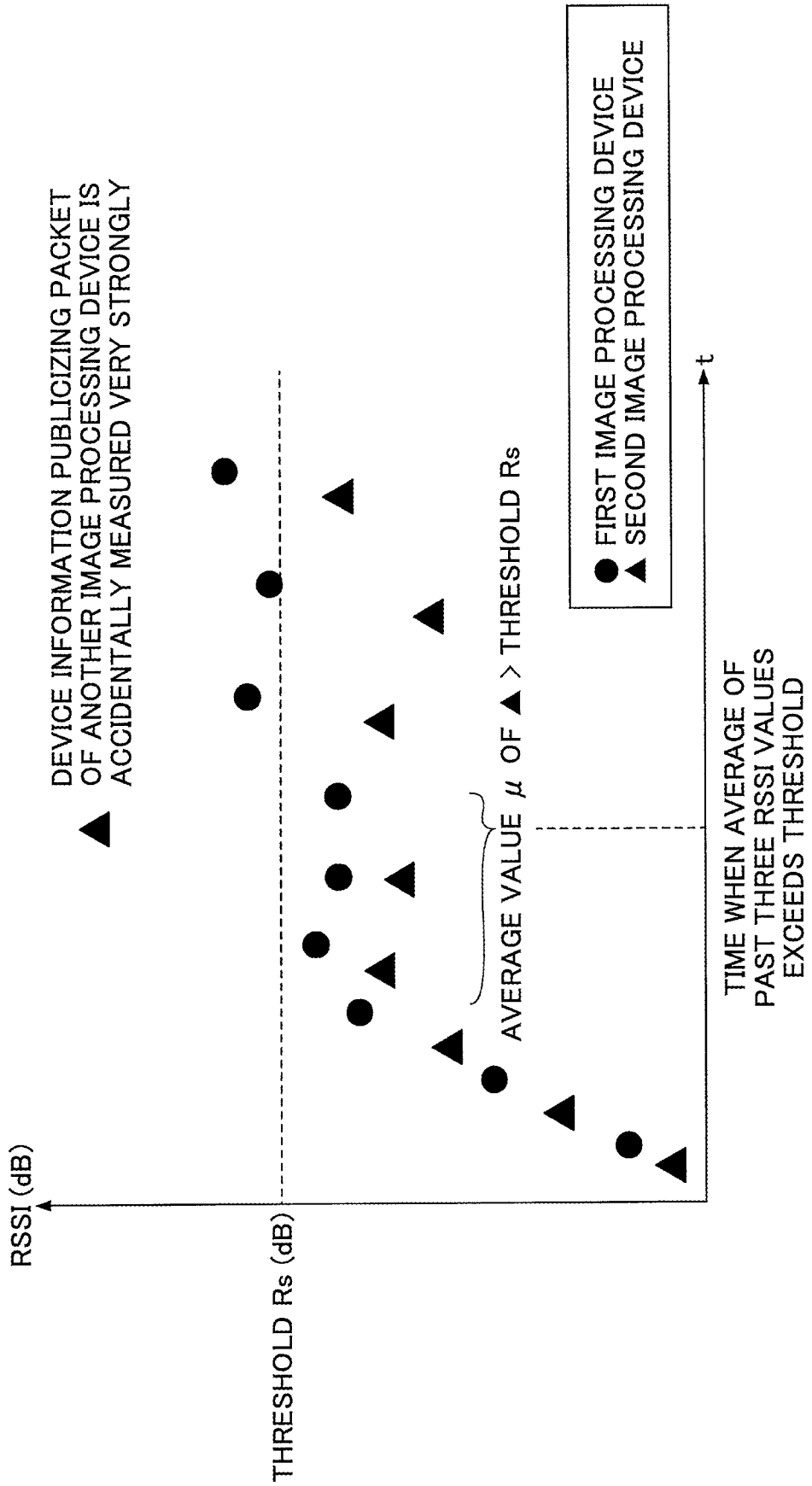
FIG. 14 is a graph showing a temporal change (3) of received signal strength of device information publicizing packets received by a radio communication terminal.

FIG. 14 is a graph showing a temporal change (3) of received signal strength of device information publicizing packets received by the radio communication terminal 200. In FIG. 14, an abscissa indicates time (t) and an ordinate indicates received signal strength (RSSI) of device information publicizing packets. FIG. 14, the received signal strengths of device information publicizing packets transmitted by two image processing devices 100 are measured, the two image processing devices 100 including a first image processing device 100 and a second image processing device 100. The first image processing device 100 is in front of the radio communication terminal 200 and is desired to be connected thereto. However, the received signal strength of device information publicizing packets transmitted by the second image processing device 100 may be accidentally measured as a value higher than a threshold Rs. In this case, because an average value μ (dB) of the received signal strength exceeds the threshold Rs (dB), the radio communication terminal 200 may transmit a connection information request to the second image processing device 100 and perform a connection process based on connection information transmitted by the second image processing device 100.

In this manner, the radio communication terminal 500 according to the first embodiment specifies a connection target based on whether the inclination of the radio communication terminal 500 is within a predetermined range of the inclination of the display screen of the operation unit 122 in the image processing device 100 in addition to the received signal strength of device information publicizing packets. In accordance with this, the radio communication terminal 500 is capable of reducing connection to an image processing device not intended by the user.

<Operation of Image Processing System>

Figure 15:
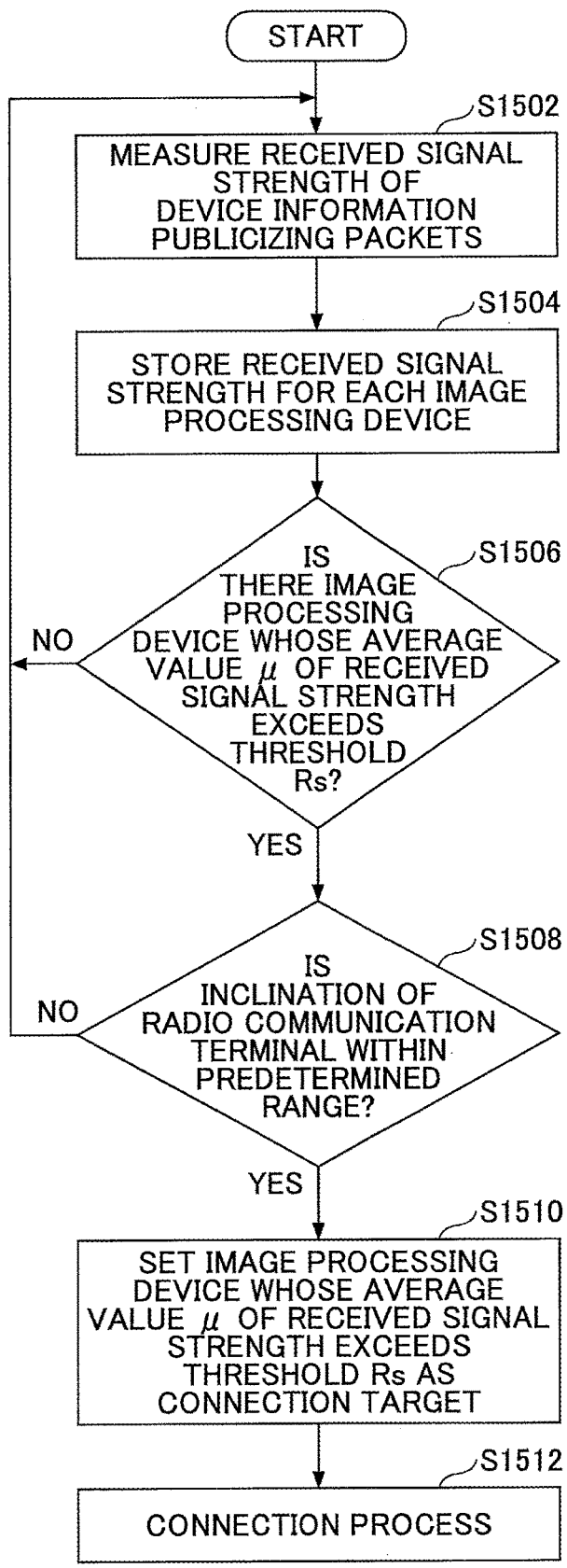
FIG. 15 is a flowchart showing an operation of a radio communication terminal according to the first embodiment.

FIG. 15 is a flowchart mainly showing an operation of the radio communication terminal 500 in an image processing system according to the first embodiment. Steps S1502-S1506 may use steps S902-S906 shown in FIG. 9.

In step S1508, if there is an image processing device 100 whose average value μ of the received signal strength exceeds the threshold Rs, the connection target specifying unit 558 of the radio communication terminal 500 determines whether the inclination detecting unit 572 has detected that the inclination of the radio communication terminal 500 is within a predetermined range. If the inclination of the radio communication terminal 500 is not detected to be within the predetermined range (NO in step S1508), the process returns to step S1502.

In step S1510, if the inclination detecting unit 572 has detected that the inclination of the radio communication terminal 500 is within the predetermined range, the connection target specifying unit 558 of the radio communication terminal 500 sets the image processing device 100 as a connection target.

In step S1512, the connection information obtaining unit 560 of the radio communication terminal 500 sends a connection information request to the image processing device 100 set as the connection target. When the connection processing unit 562 of the radio communication terminal 500 obtains the connection information transmitted by the image processing device 100 set as the connection target, the connection processing unit 562 uses the connection information to perform a connection process with the image processing device 100.

After the connection process is performed in step S1512, the job requesting unit 564 of the radio communication terminal 500 transmits a job such as printing or scanning from the second transmitting and receiving unit 554 to the connected image processing device 100, the job being requested by the user.

In the flowchart shown in FIG. 15, after the process in step S1508 is performed, the process in steps S1502-S1506 and S1510 may be performed.

In addition, in step S1506 shown in FIG. 15, the connection target specifying unit 558 collectively determines whether there is an image processing device 100 whose average value μ of the received signal strength of device information publicizing packets exceeds the threshold Rs. However, this determination may be performed for each image processing device 100. For example, upon each reception of device information publicizing packets from each image processing device 100, the connection target specifying unit 558 may individually calculate an average value μ of the received signal strength from the image processing device 100 and if the calculated average value μ exceeds the threshold Rs, the connection target specifying unit 558 may perform the process in step S1508.

According to the first embodiment, an image processing device 100 is specified as a connection target of the radio communication terminal 500 based on whether the inclination of the radio communication terminal 500 is within a predetermined range of the inclination of the display screen of the operation unit 122 in the image processing device 100 in addition to the received signal strength of device information publicizing packets. In accordance with this, it is possible for the radio communication terminal 500 to reduce erroneous connection to an image processing device 100 which is not a desired image processing device 100.

<Variation>

In an image processing system according to this variation, the device information publicizing packet creating unit 406 of the operation unit 122 transmits a value of the inclination of the operation unit 122 (inclination of the display screen of the touch panel 172) of its own image processing device 100 by including the value in device information publicizing packets.

For example, if an angle of the operation unit 122 is fixed in the image processing device 100, the device information publicizing packet creating unit 406 stores a value of the inclination of the operation unit 122 in the storage unit 416 in advance and transmits the stored value of the inclination of the operation unit 122 by including the stored value in device information publicizing packets.

Further, if the inclination of the operation unit 122 can be changed in the image processing device 100, the image processing device 100 measures a value of the inclination of the operation unit 122 based on acceleration measured by the sensor 170 in the same manner as in the radio communication terminal 500. Further, the device information publicizing packet creating unit 406 transmits the measured value of the inclination of the operation unit 122 by including the measured value in device information publicizing packets.

In addition, when the image processing device 100 measures the value of the inclination of the operation unit 122, preferably, the value of the inclination of the operation unit 122 is measured at predetermined time intervals, for example, in order to update the value of the inclination of the operation unit 122 included in the device information publicizing packets.

The connection target specifying unit 558 of the radio communication terminal 500 specifies a connection target based on whether a difference between the inclination of the radio communication terminal 500 and the inclination of the operation unit 122 included in device information publicizing packets is within a predetermined range in addition to the received signal strength of device information publicizing packets. In accordance with this, even if the inclination of the operation unit 122 in the image processing device 100 is changed, it is possible for the radio communication terminal 500 to specify a desired image processing device 100. Further, even if the inclination such as an angle of the operation unit 122 is different depending on image processing devices 100, it is possible for the radio communication terminal 500 to specify a desired image processing device 100.

Second Embodiment

FIG. 1 may be applied to an image processing system according to a second embodiment and the image processing system includes a radio communication terminal 600 instead of the radio communication terminal 200. A part of functions of the radio communication terminal in the image processing system according to the second embodiment is different from corresponding functions in the image processing system described in <Outline>.

<Functional Configuration in the Second Embodiment>

Figure 16:
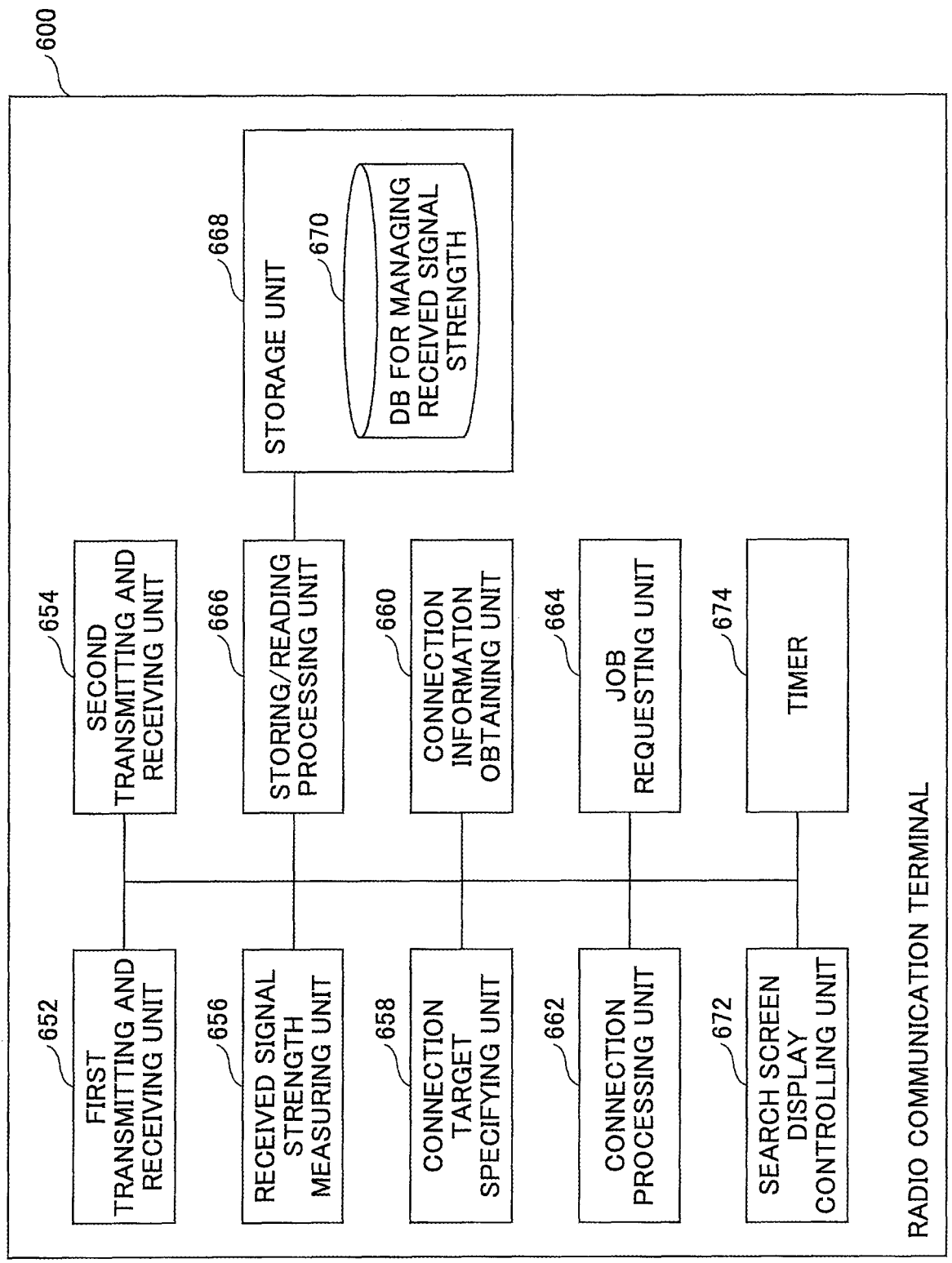
FIG. 16 is a functional block diagram of a radio communication terminal according to a second embodiment.

In the following, a functional configuration is described. FIG. 16 is a functional block diagram of the radio communication terminal 600. The radio communication terminal 600 includes a first transmitting and receiving unit 652, a second transmitting and receiving unit 654, a received signal strength measuring unit 656, a connection target specifying unit 658, a connection information obtaining unit 660, a connection processing unit 662, a job requesting unit 664, a storing/reading processing unit 666, a search screen display controlling unit 672, and a timer 674. Each of these units serves as a function or a unit to be implemented when any one of constituent elements shown in FIG. 6 operates by an instruction from the CPU 202 in accordance with the radio communication terminal program stored in the HDD 208. Further, the radio communication terminal 600 includes a storage unit 668 constructed with the HDD 208 shown in FIG. 6.

<Functional Units of Radio Communication Terminal 600>

In the following, each unit of the radio communication terminal 600 is described. The first transmitting and receiving unit 652, the second transmitting and receiving unit 654, the received signal strength measuring unit 656, the connection information obtaining unit 660, the connection processing unit 662, the job requesting unit 664 and the storing/reading processing unit 666 may employ functions of corresponding units of the radio communication terminal 200.

The search screen display controlling unit 672 of the radio communication terminal 600 is implemented with the LCD 214 and an instruction from the CPU 202 shown in FIG. 6. The search screen display controlling unit 672 performs control to display a search screen to show a search for an image processing device to the user of the radio communication terminal 600. This search screen also displays a start button to be selected to start searching for the image processing device and a cancellation button to be selected to cancel the search.

The timer 674 of the radio communication terminal 600 is implemented with an instruction from the CPU 202 shown in FIG. 6. The timer 674 measures that a period of time set in advance such as 30 seconds has elapsed.

The connection target specifying unit 658 of the radio communication terminal 600 is implemented with an instruction from the CPU 202 and the radio communication terminal program stored in the HDD 208. The connection target specifying unit 658 causes the search screen display controlling unit 672 to display a screen to show searching for an image processing device to the user of the radio communication terminal 600 while a period of time set in advance by the timer 674 has elapsed. Further, the connection target specifying unit 658 causes the storing/reading processing unit 666 to read a table for managing received signal strength in a DB 670 for managing received signal strength of the storage unit 668. Further, the connection target specifying unit 658 specifies an image processing device 100 to connect to based on the received signal strength of device information publicizing packets stored in the table for managing received signal strength and whether an inclination of the radio communication terminal 600 is within a predetermined range is detected.

If the connection target specifying unit 658 cannot specify an image processing device 100 to connect to even after the period of time set in advance has elapsed, the connection target specifying unit 658 causes the first transmitting and receiving unit 652 to cancel the searching for an image processing device 100 being performed by the first transmitting and receiving unit 652 and causes the search screen display controlling unit 672 to close the search screen being displayed by the search screen display controlling unit 672.

If the connection target specifying unit 658 cannot specify an image processing device 100 to connect to even after the period of time set in advance has elapsed, the connection target specifying unit 658 may cause the search screen display controlling unit 672 to display a message to cancel the search such as "Device is not found."

<Operation (1) of Image Processing System>

Figure 17:
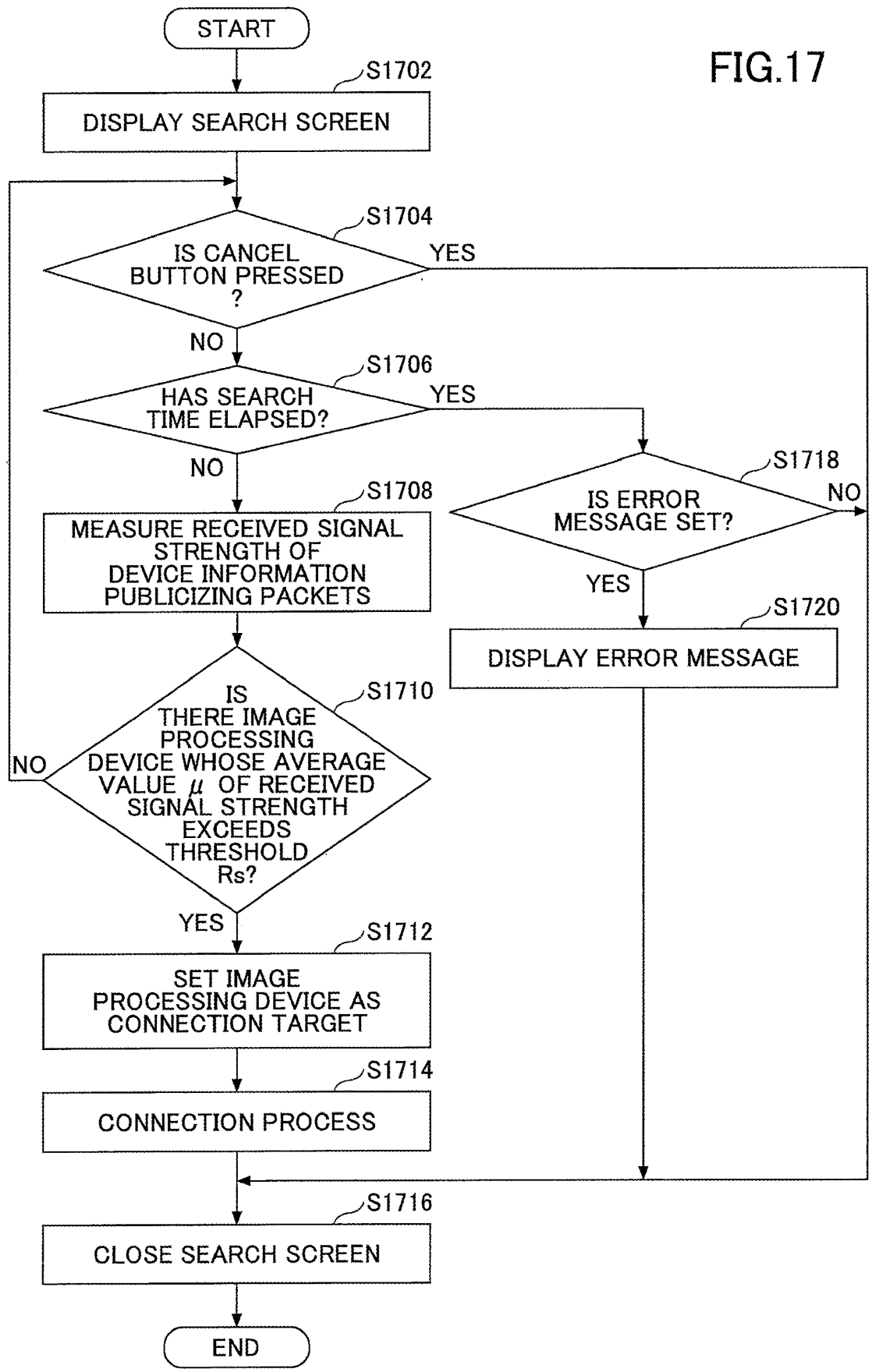
FIG. 17 is a flowchart showing an operation of a radio communication terminal according to the second embodiment.
Figure 18:
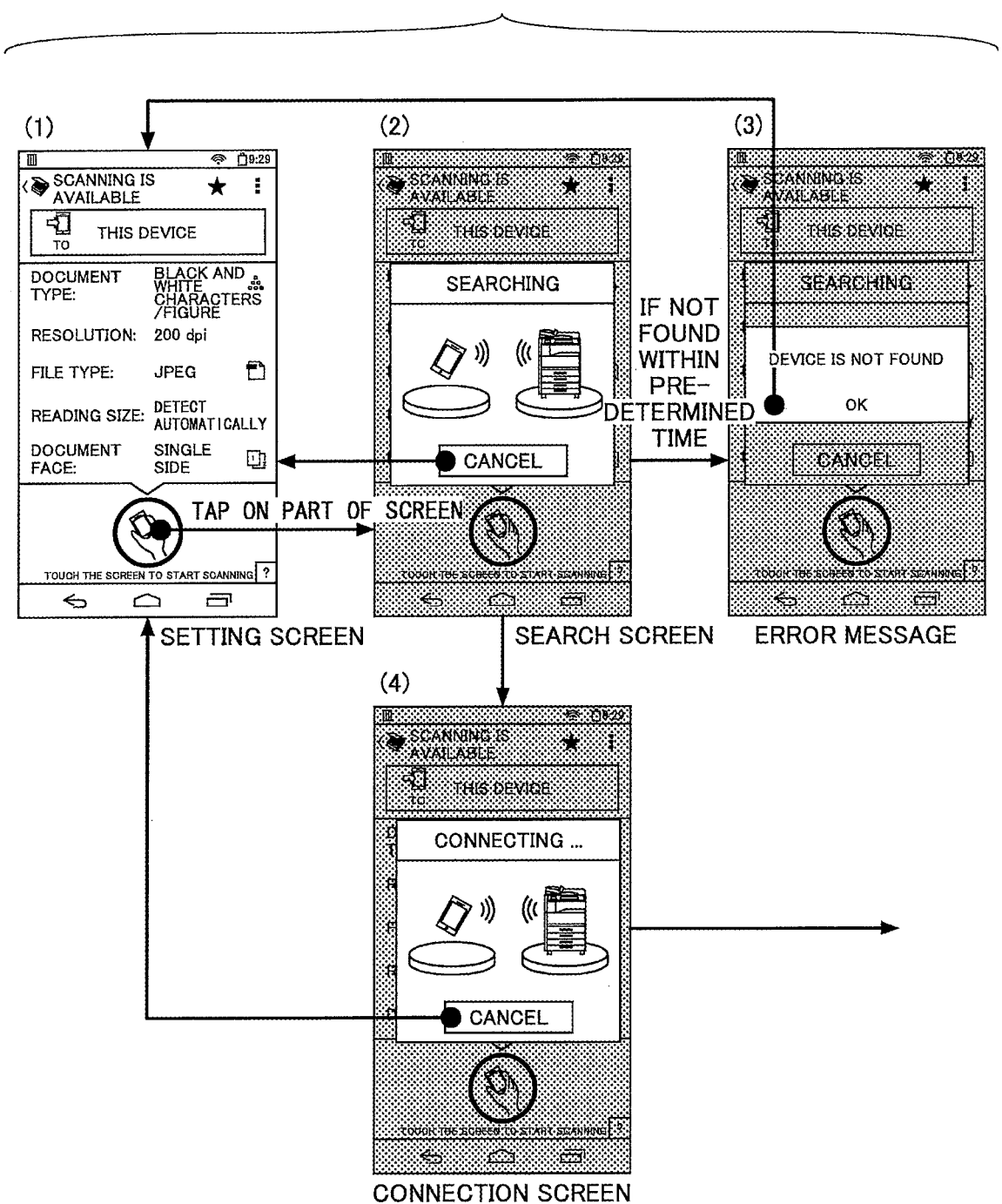
FIG. 18 is a diagram illustrating a search screen displayed on a radio communication terminal according to the second embodiment.

In the image processing system according to the second embodiment, an operation of the radio communication terminal 600 is mainly described with reference to the search screen. FIG. 17 is a flowchart mainly showing the operation of the radio communication terminal 600 in the image processing system according to the second embodiment. FIG. 18 is a diagram illustrating the search screen displayed on the radio communication terminal 600 according to the second embodiment. In this case, on the radio communication terminal 600, after a home screen is displayed, the search screen is displayed, and then a connection screen is displayed.

In step S1702, the search screen display controlling unit 672 of the radio communication terminal 600 displays the search screen on the LCD 214. The connection target specifying unit 658 starts the timer 674. For example, when the user starts a connection app to connect the radio communication terminal 600 to the image processing device 100, the home screen shown in FIG. 18-(1) is displayed. In the home screen, job properties such as "DOCUMENT TYPE," "RESOLUTION," "FILE TYPE," "READING SIZE," "DOCUMENT FACE" and the start button to start searching for an image processing device 100 may be displayed. When the user selects the start button, the search screen shown in FIG. 18-(2) is displayed and a search for an image processing device 100 starts.

In step S1704, the connection target specifying unit 658 of the radio communication terminal 600 determines whether the cancellation button in the search screen displayed by the search screen display controlling unit 672 is selected (pressed, for example). If the cancellation button in the search screen is selected (YES in step S1704), the process proceeds to step S1716 described later. As shown in FIG. 18-(2), the cancellation button to be selected to cancel the search is displayed on the search screen. The user can cancel the search by selecting the cancellation button.

If the connection target specifying unit 658 of the radio communication terminal 600 determines that the cancellation button is not selected in the search screen (NO in step S1704), the connection target specifying unit 658 determines whether a search time has elapsed in the timer 674 in step S1706.

If the connection target specifying unit 658 determines that the search time has not elapsed (NO in step S1706), in step S1708, the received signal strength measuring unit 656 of the radio communication terminal 600 measures the received signal strength of device information publicizing packets received by the first transmitting and receiving unit 652.

In step S1710, the connection target specifying unit 658 of the radio communication terminal 600 determines whether there is an image processing device 100 whose average value μ of the received signal strength of device information publicizing packets exceeds a threshold Rs. If there is no image processing device 100 whose average value μ of the received signal strength of device information publicizing packets exceeds the threshold Rs (NO in step S1710), the process returns to step S1704.

If there is an image processing device 100 whose average value μ of the received signal strength of device information publicizing packets exceeds the threshold Rs (YES in step S1710), in step S1712, the connection target specifying unit 658 of the radio communication terminal 600 sets the image processing device 100 as a connection target.

In step S1714, the connection information obtaining unit 660 of the radio communication terminal 600 sends a connection information request to the image processing device 100 set as the connection destination. When the connection processing unit 662 of the radio communication terminal 600 obtains the connection information transmitted by the image processing device 100 set as the connection target, the connection processing unit 662 uses the connection information to perform a connection process with the image processing device 100. In this case, the search screen display controlling unit 672 changes the search screen to the connection screen shown in FIG. 18-(4). In this connection screen, the cancellation button to be selected to cancel the connection is displayed. The user can cancel the connection by selecting the cancellation button.

In step S1716, the search screen display controlling unit 672 of the radio communication terminal 600 closes the search screen displayed on the LCD 214.

If the search time has elapsed in step S1706, the search screen display controlling unit 672 of the radio communication terminal 600 determines whether an error message is set to be displayed in step S1718. If the error message is not set to be displayed (NO in step S1718), the process proceeds to step S1716.

If the error message is set to be displayed (YES in step S1718), the search screen display controlling unit 672 of the radio communication terminal 600 displays the error message in step S1720. In this case, the search screen display controlling unit 672 changes the search screen to an error display screen shown in FIG. 18-(3). On this error display screen, the fact that a device is not found during the search time is displayed. Then the process proceeds to step S1716.

<Operation (2) of Image Processing System>

Figure 19:
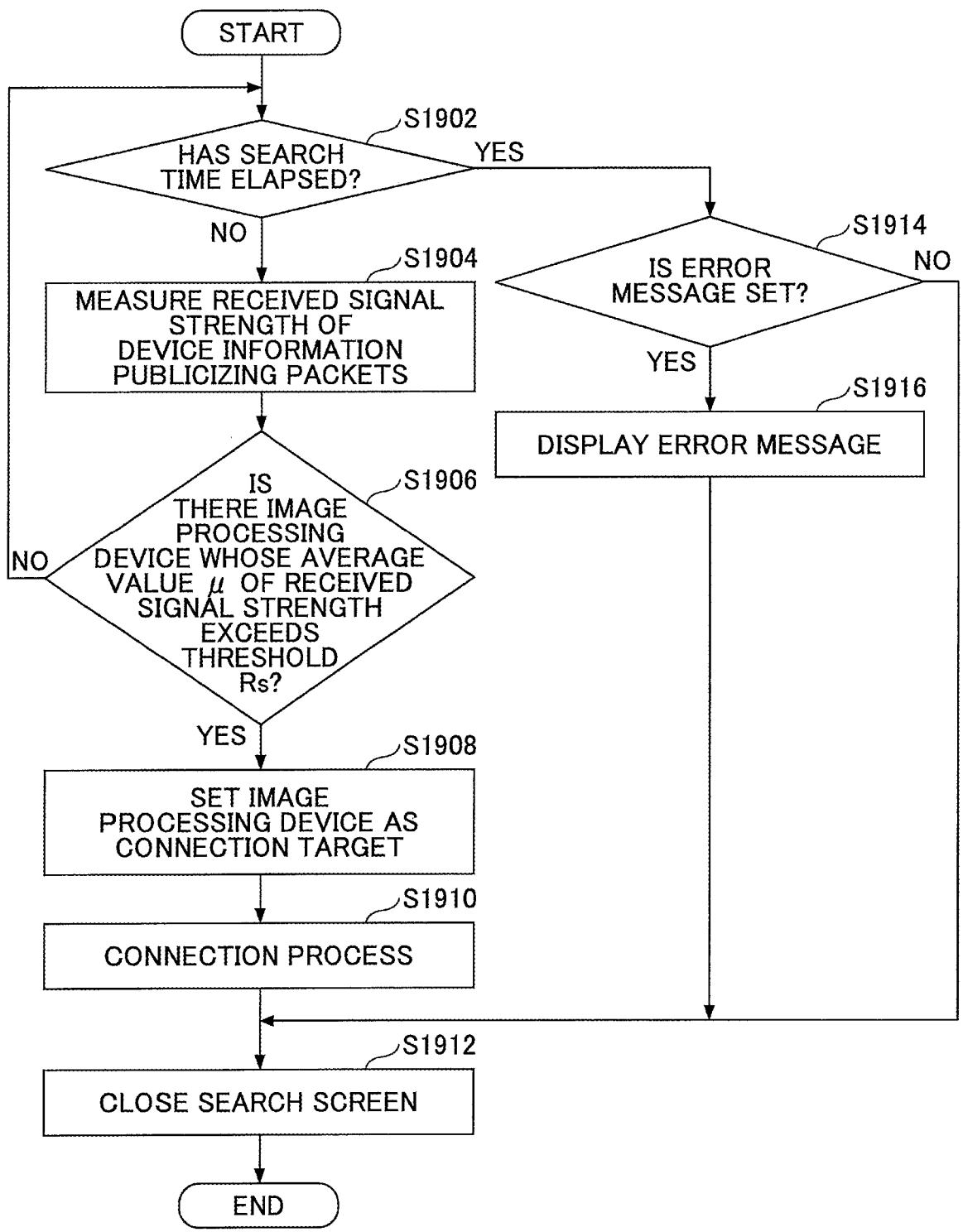
FIG. 19 is a flowchart showing an operation of a radio communication terminal according to the second embodiment.
Figure 20:
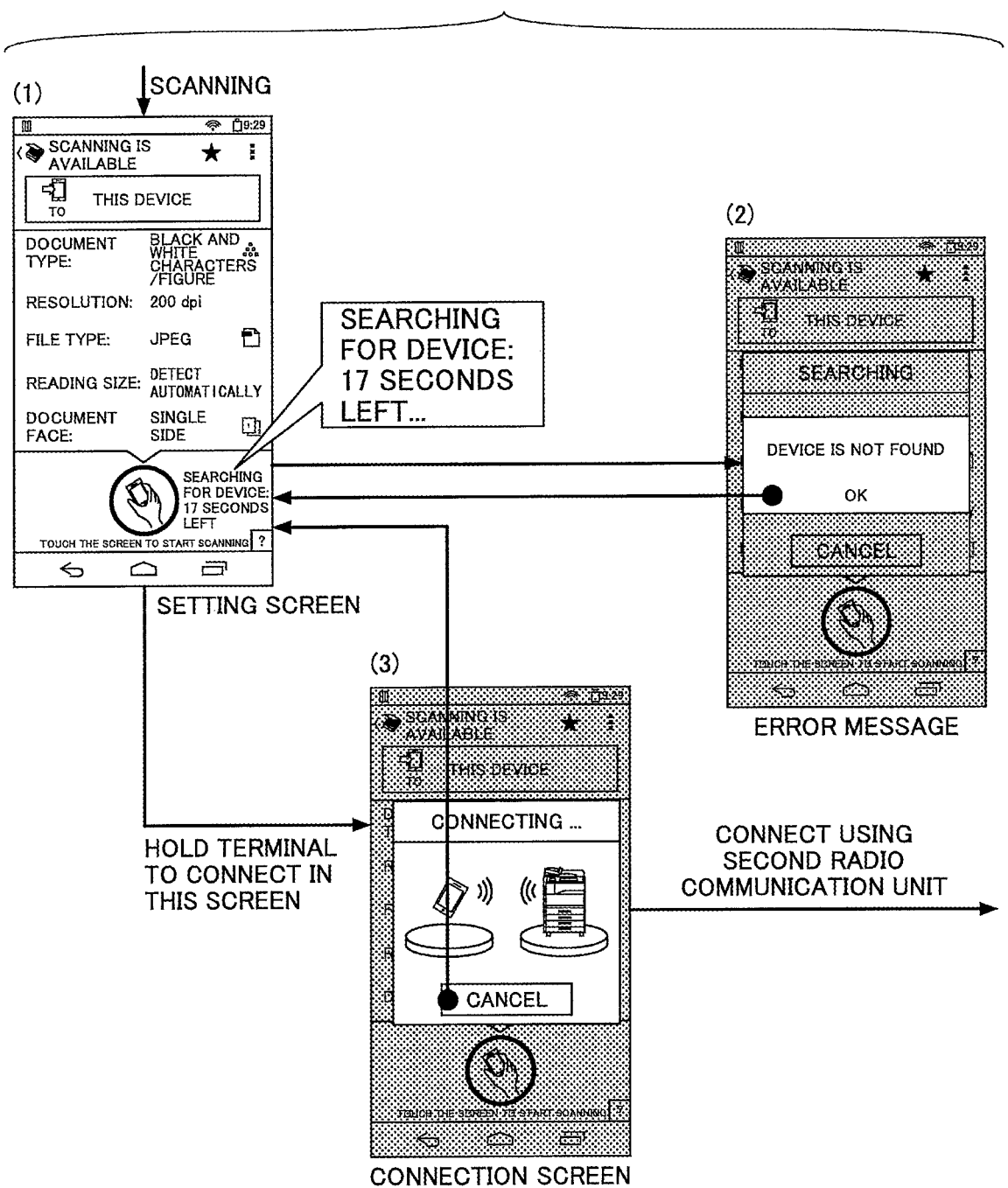
FIG. 20 is a diagram illustrating a search screen displayed on a radio communication terminal according to the second embodiment.

In the image processing system according to the second embodiment, another operation of the radio communication terminal 600 is mainly described with reference to the search screen. FIG. 19 is a flowchart mainly showing the operation of the radio communication terminal 600 in the image processing system according to the second embodiment. FIG. 20 is a diagram illustrating the search screen displayed on the radio communication terminal 600 according to the second embodiment. In this case, on the radio communication terminal 600, after the home screen is displayed, the connection screen is displayed while the search screen is not displayed.

In step S1902, the connection target specifying unit 658 of the radio communication terminal 600 determines whether the search time has elapsed in the timer 674. For example, when the user starts the connection app to connect the radio communication terminal 600 to the image processing device 100, the home screen shown in FIG. 20-(1) is displayed. In the home screen, job properties such as "DOCUMENT TYPE," "RESOLUTION," "FILE TYPE," "READING SIZE," "DOCUMENT FACE" and the start button to start searching for an image processing device 100 may be displayed. When the user selects the start button, a search for an image processing device 100 starts and a countdown of the search time set in advance in the timer 674 starts. In the home screen, the cancellation button to be selected to cancel the search may be displayed. The user can cancel the search by selecting the cancellation button.

If the connection target specifying unit 658 determines that the search time has not elapsed (NO in step S1902), in step S1904, the received signal strength measuring unit 656 of the radio communication terminal 600 measures the received signal strength of device information publicizing packets received by the first transmitting and receiving unit 652.

In step S1906, the connection target specifying unit 658 of the radio communication terminal 600 determines whether there is an image processing device 100 whose average value μ of the received signal strength of device information publicizing packets exceeds a threshold Rs. If there is no image processing device 100 whose average value μ of the received signal strength of device information publicizing packets exceeds the threshold Rs (NO in step S1906), the process returns to step S1902.

If there is an image processing device 100 whose average value μ of the received signal strength of device information publicizing packets exceeds the threshold Rs (YES in step S1906), in step S1908, the connection target specifying unit 658 of the radio communication terminal 600 sets the image processing device 100 as a connection target.

In step S1910, the connection information obtaining unit 660 of the radio communication terminal 600 sends a connection information request to the image processing device 100 set as the connection destination. When the connection processing unit 662 of the radio communication terminal 600 obtains the connection information transmitted by the image processing device 100 set as the connection target, the connection processing unit 662 uses the connection information to perform a connection process with the image processing device 100. In this case, the search screen display controlling unit 672 changes the search screen to the connection screen shown in FIG. 20-(3). In this connection screen, the cancellation button to be selected to cancel the connection is displayed. The user can cancel the connection by selecting the cancellation button.

In step S1912, the search screen display controlling unit 672 of the radio communication terminal 600 closes the search screen displayed on the LCD 214.

If the search time has elapsed in step S1902, the search screen display controlling unit 672 of the radio communication terminal 600 determines whether an error message is set to be displayed in step S1914. If the error message is not set to be displayed (NO in step S1914), the process proceeds to step S1912.

If the error message is set to be displayed (YES in step S1914), the search screen display controlling unit 672 of the radio communication terminal 600 displays the error message in step S1916. In this case, the search screen display controlling unit 672 changes the search screen to the error display screen shown in FIG. 20-(2). On this error display screen, the fact that a device is not found during the search time is displayed. On the error display screen, an "OK" button to be selected when an error is confirmed is displayed. When the user selects this "OK" button, the process proceeds to step S1912.

According to the second embodiment, the radio communication terminal measures the received signal strength of device information publicizing packets in response to an instruction by the user to search for an image processing device 100. Accordingly, even if the radio communication terminal is left to be connectable in proximity to an image processing device, the radio communication terminal does not measure the received signal strength of device information publicizing packets in error. In accordance with this, it is possible to prevent a decline of a remaining battery level of the radio communication terminal before the user becomes aware of it.

It is possible to combine the above embodiments and the variation where necessary. Further, it is possible to apply the above embodiments and the variation to a projection device such as a projector and an electronic whiteboard in addition to an image forming device such as a multifunction peripheral having functions of printing, scanning, copying, and the like.

In the above embodiments, the image processing system is an example of an image processing system. The radio communication terminal is an example of an information processing apparatus. The received signal strength measuring unit is an example of a radio wave strength measuring unit and an obtaining unit. The connection target specifying unit is an example of a selection unit. The job requesting unit is an example of an operation detecting unit. The connection processing unit is an example of a determining unit and a connection unit. The inclination detecting unit is an example of a measuring unit. And the timer is an example of a counting unit.

While the present invention is described with reference to the specific examples and the variation, each of the examples and the variation is presented as a mere example and those skilled in the art would understand various variations, modifications, alternatives, replacements, and the like. Although the devices in the examples of the present invention are described with reference to functional block diagrams for convenience sake of description, such devices may be implemented with hardware, software, or a combination thereof. The present invention is not limited to the above examples, but various variations, modifications, alternatives, replacements, and the like are included without departing from the scope of the present invention.

According to the described examples, in an information processing system in which an information processing apparatus obtains connection information via radio communication when connecting to an image processing device and uses the connection information to connect to the image processing device via the radio communication, even if a plurality of image processing devices are disposed, it is possible to obtain the connection information from a desired image processing device via the radio communication.

Further, the present invention is not limited to these embodiments, and various variations and modifications may be made without departing from the scope of the present invention.

This application is a continuation of U.S. application Ser. No. 15/052,072, filed Feb. 24, 2016, which claims the benefit of priorities of Japanese Priority Application No. 2015-036830 filed on Feb. 26, 2015 and Japanese Priority Application No. 2016-014423 filed on Jan. 28, 2016, the entire contents of each of which are hereby incorporated by reference.

What I claimed is:

1. An information processing apparatus, comprising:
circuitry configured to
receive radio waves from at least one of a plurality of devices via a network;
detect a user operation indicating to start a processing operation to be performed by any one of the plurality of devices;
in response to detecting the user operation, determine, based on the radio waves received from the at least one of the plurality of devices, a device of the plurality of devices that is used for performing the processing operation; and
request the determined device to start the processing operation.

2. The information processing apparatus according to claim 1, wherein the circuitry is further configured to:
receive the radio waves via a first wireless communication system, which is Bluetooth, and
acquire, via the first wireless communication system, at least a part of connection information for requesting the processing operation to be performed by the determined device, via a second wireless communication system different from the first wireless communication system.

3. The information processing apparatus according to claim 1, wherein the circuitry is further configured to:
measure a passage of a predetermined time set in advance, and
stop the determination upon a failure to determine the device, even after the predetermined time has elapsed.

4. The information processing apparatus according to claim 1, wherein the circuitry is further configured to:
measure a strength of the received radio waves; and
determine the device according to the measured strength of the received radio waves.

5. The information processing apparatus according to claim 4, wherein the circuitry is further configured to measure the strength of the received radio waves upon detecting the user operation.

6. The information processing apparatus according to claim 2, wherein after detecting the user operation, the circuitry is further configured to connect to the device via the second wireless communication system, based on the acquired connection information.

7. The information processing apparatus according to claim 1, wherein the user operation indicating to start the processing operation to be performed by any one of the plurality of devices is pressing of a scan start button; and
the circuitry is further configured to determine, after detecting the user operation, the device to execute the processing operation.

8. The information processing apparatus according to claim 1, wherein the device of the plurality of devices is one of an image forming apparatus, a projection device, and an electronic whiteboard.

9. The information processing apparatus according to claim 1, wherein the circuitry is further configured to detect the user operation indicating to start the processing operation, which is one of printing, scanning, and copying.

10. The information processing apparatus according to claim 1, wherein the information processing apparatus is one of a smart phone and a table terminal.

11. An information processing system, comprising:
a plurality of devices; and
an information processing apparatus connectable to at least one of the plurality of devices over a network,
the information processing apparatus including circuitry configured to
receive radio waves from at least one of the plurality of devices via the network;
detect a user operation indicating to start a processing operation to be performed by any one of the plurality of devices;
in response to detecting the user operation, determine, based on the radio waves received from the at least one of the plurality of devices, a device of the plurality of devices that is used for performing the processing operation; and
request the determined device to start the processing operation,
the device of the plurality of devices includes circuitry configured to process the processing operation requested by the information processing apparatus.

12. An information processing method, comprising:
receiving radio waves from at least one of a plurality of devices via a network;
detecting a user operation indicating to start a processing operation to be performed by any one of the plurality of devices;
in response to detecting the user operation, determining, based on the radio waves received from the at least one of the plurality of devices, a device of the plurality of devices that is used for performing the processing operation; and
requesting the determined device to start the processing operation.

13. The information processing apparatus according to claim 1, wherein the device is a device that is to start the processing operation.

14. The information processing apparatus according to claim 1, wherein the device of the plurality of devices is a projection device.

15. The information processing apparatus according to claim 1, wherein the device of the plurality of devices is an electronic whiteboard.

16. The information processing apparatus according to claim 1, wherein in response to the user operation, start searching for a device of the plurality of devices and measure a strength of the radio waves.

17. The information processing method according to claim 12, further comprising:
receiving the radio waves via a first wireless communication system, which is Bluetooth, and
acquiring, via the first wireless communication system, at least a part of connection information for requesting the processing operation to be performed by the determined device, via a second wireless communication system different from the first wireless communication system.

18. The information processing method according to claim 12, further comprising:
measuring a passage of a predetermined time set in advance, and
stopping the determination upon a failure to determine the device, even after the predetermined time has elapsed.

19. The information processing method according to claim 12, further comprising:
measuring a strength of the received radio waves; and
determining the device according to the measured strength of the received radio waves.

20. The information processing method according to claim 19, further comprising:
measuring the strength of the received radio waves upon detecting the user operation.

21. The information processing method according to claim 17, wherein after detecting the user operation, connecting to the device via the second wireless communication system, based on the acquired connection information.

22. The information processing method according to claim 12, wherein the user operation indicating to start the processing operation to be performed by any one of the plurality of devices is pressing of a scan start button; and
determining, after detecting the user operation, the device to execute the processing operation.

23. The information processing method according to claim 12, wherein the device of the plurality of devices is one of an image forming apparatus, a projection device, and an electronic whiteboard.

24. The information processing method according to claim 12, further comprising:
detecting the user operation indicating to start the processing operation, which is one of printing, scanning, and copying.

25. The information processing method according to claim 12, wherein the device is a device that is to start the processing operation.

26. The information processing method according to claim 12, wherein the device of the plurality of devices is a projection device.

27. The information processing method according to claim 12, wherein the device of the plurality of devices is an electronic whiteboard.

28. The information processing method according to claim 12, wherein in response to the user operation, start searching for a device of the plurality of devices and measuring a strength of the radio waves.

29. A non-transitory computer-readable storage medium storing executable instructions which, when executed by circuitry, cause the circuitry to perform a method comprising:
receiving radio waves from at least one of a plurality of devices via a network;
detecting a user operation indicating to start a processing operation to be performed by any one of the plurality of devices;
in response to detecting the user operation, determining, based on the radio waves received from the at least one of the plurality of devices, a device of the plurality of devices that is used for performing the processing operation; and
requesting the determined device to start the processing operation.

* * * * *